United States Patent
Hong et al.

(10) Patent No.: US 11,118,975 B2
(45) Date of Patent: Sep. 14, 2021

(54) MINIATURIZED AND INTEGRATED PHOTONIC SPECTROMETERS

(71) Applicant: The Regents of the University of California, Oakland, CA (US)

(72) Inventors: Brandon Hong, San Clemente, CA (US); Yeshaiahu Fainman, San Diego, CA (US); Andrew Grieco, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 299 days.

(21) Appl. No.: 16/303,653

(22) PCT Filed: May 22, 2017

(86) PCT No.: PCT/US2017/033892
§ 371 (c)(1),
(2) Date: Nov. 20, 2018

(87) PCT Pub. No.: WO2017/201548
PCT Pub. Date: Nov. 23, 2017

(65) Prior Publication Data
US 2020/0319031 A1   Oct. 8, 2020

Related U.S. Application Data

(60) Provisional application No. 62/339,316, filed on May 20, 2016.

(51) Int. Cl.
*G01J 3/02* (2006.01)
*G01J 3/45* (2006.01)
*G02F 1/313* (2006.01)

(52) U.S. Cl.
CPC ............... *G01J 3/45* (2013.01); *G01J 3/0208* (2013.01); *G01J 3/0229* (2013.01); *G01J 3/0237* (2013.01); *G01J 3/0256* (2013.01); *G02F 1/3132* (2013.01)

(58) Field of Classification Search
CPC .......... G01J 3/45; G01J 3/0208; G01J 3/0229; G01J 3/0237; G01J 3/0256; G01J 3/0259; G01J 3/4531; G01J 3/0218; G01J 3/28; G01J 3/18; G02F 1/3132; G02B 6/26; G02B 6/42
See application file for complete search history.

(56) References Cited

U.S. PATENT DOCUMENTS

| | | | |
|---|---|---|---|
| 8,282,882 B2 | 10/2012 | Chakravarty et al. | |
| 2003/0231826 A1* | 12/2003 | Boyd | G02B 6/12004 385/27 |
| 2006/0055935 A1 | 3/2006 | Cheben et al. | |
| 2009/0103736 A1* | 4/2009 | Pacher | G02F 1/395 380/278 |
| 2009/0208162 A1 | 8/2009 | Yap | |

(Continued)

OTHER PUBLICATIONS

Bruker https://www.bruker.com/products/infrared-near-infrared-and-raman-spectroscopy.html?print=1309527F.

(Continued)

*Primary Examiner* — Abdullahi Nur
(74) *Attorney, Agent, or Firm* — Perkins Coie LLP

(57) ABSTRACT

Compact optical spectrometers are provided to measure optical spectral composition of light.

15 Claims, 25 Drawing Sheets

(56) References Cited

U.S. PATENT DOCUMENTS

2014/0085632 A1* 3/2014 Preston ................ G01J 3/2823
356/326
2014/0092385 A1 4/2014 Nitkowski et al.
2017/0227399 A1* 8/2017 Hu ........................ G01J 3/4531

OTHER PUBLICATIONS

Hashimoto et al., "Multichannel Fourier-transform infrared spectrometer." Applied optics 31.28 (1992): 6096-6101.
Horiba http://www.horiba.com/us/en/scientific/horiba-instruments/.
Keysight http://www.keysight.com/en/pc-0000400020002%3Acsg%3Apgr/wavelength-meters?nid=-536900356.0&cc=US&lc=eng.
Kogelnik et al., "2. Theory of Dielectric Waveguides," in Integrated Optics ( Topics in Applied Physics), Berlin, DE, Springer-Verlag, 1975, pp. 13-81.
Ocean Optics http://oceanoptics.com/product-category/modular-spectrometers/.
Thermoscientific http://www.thermoscientific.com/en/products/laboratory-ftir.html.
International Search Report and Written Opinion for PCT Application No. PCT/US2017/033892, dated Sep. 22, 2017, 11 pages.

\* cited by examiner

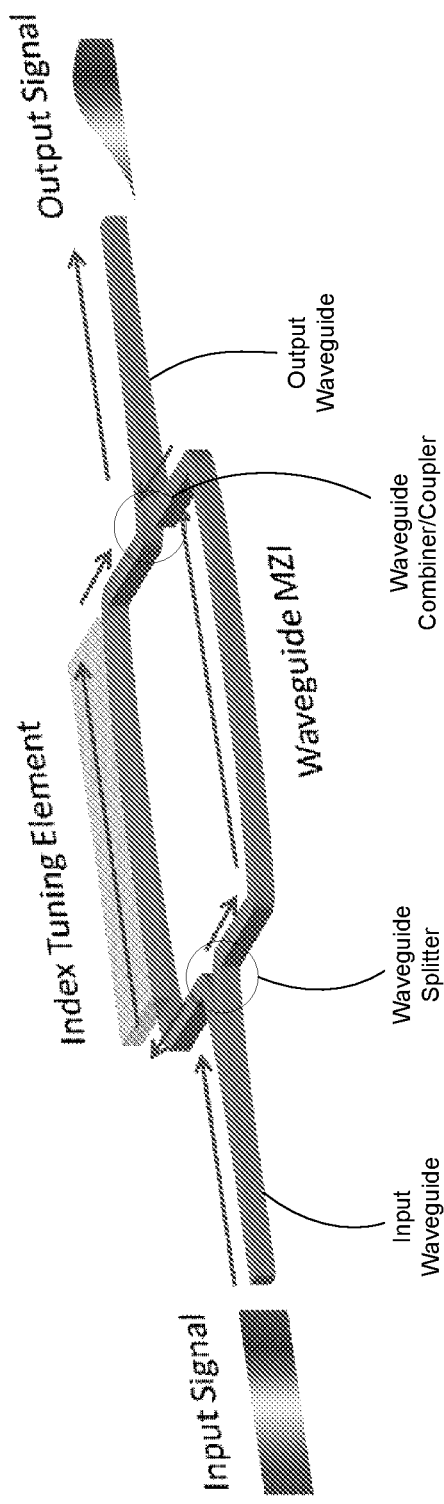
FIG. 1A
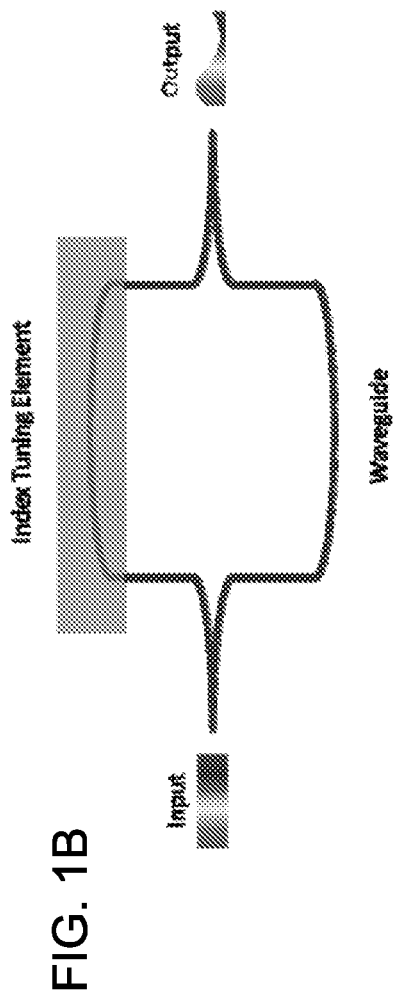
FIG. 1B
FIG. 1

MINIATURIZED AND INTEGRATED PHOTONIC SPECTROMETERS

CROSS-REFERENCE TO RELATED APPLICATIONS

This patent document is a 371 National Phase Application of PCT Application No. PCT/US2017/033892 entitled "MINIATURIZED AND INTEGRATED PHOTONIC SPECTROMETERS" filed on May 22, 2017, which claims priorities to and benefits of U.S. Provisional Patent Application No. 62/339,316 entitled "MINIATURIZED AND INTEGRATED PHOTONIC SPECTROMETERS" filed on May 20, 2016. The entire contents of the aforementioned patent applications incorporated by reference as part of the disclosure of this patent document.

TECHNICAL FIELD

This patent document relates to systems, devices, and processes for analyzing spectral composition of a light signal.

BACKGROUND

A spectrometer typically refers to an apparatus that is used to measure spectrum. Typical spectrometers show intensity of light as a function of wavelength or frequency of the light. Conventional spectrometers often have a hardware footprint that makes integration and compactization into small modules difficult.

SUMMARY

Techniques, systems, and devices are disclosed for analyzing spectral composition of light using compact spectrometers.

In one example aspect. In some embodiments, a device composed of a Mach-Zehnder interferometer in which the refractive index in one of the device arms is tunable is disclosed. The spectral content of the input signal can be determined from the transmittance of the device as a function of the variable refractive index.

In another example aspect, a device that is composed of distributed Bragg reflectors and a tunable index ring resonator is disclosed. The input signal is partitioned using the Bragg reflectors, which have bandwidth equal to the free spectral range of the resonator. One ring resonator is paired with each Bragg stopband, and by tuning the ring resonators the spectral content of the input signal can be determined.

In another example aspect, a device similar in operation to that described above in which the tunable ring resonators are replaced by tunable Bragg reflector resonators is disclosed. This arrangement has advantages in terms of packing density and partition bandwidth.

In another example aspect, a free-space non-scanning Fourier transform spectrometer, which is a device to measure a stationary (non-scanning) Fourier transform spectrum that introduces variable spectral dispersion to improve spectral resolution and relax dynamic range requirements on the detector, in the measured interferogram is disclosed.

In another example aspect, a device is provided for analyzing spectral composition of an input light signal and includes an input end at which the input light signal is received and split into a first component and a second component; a first optical path carrying the first component, the first arm comprising a waveguide; a second optical path carrying the second component, the second optical path having a tunable refractive index; and an output end, at which a first resulting signal from passage of the first component through the first optical path is combined with a second resulting signal from passage of the second component through the second optical path.

In another example aspect, a device is provided to include a plurality of distributed Bragg reflectors and a tunable index ring resonator. The device partitions incident light signal using the Bragg reflectors into multiple components which have bandwidth equal to the free spectral range of the ring resonator to measure spectral content of the incident light signal.

In another example aspect, a device is provided to include a plurality of distributed Bragg reflectors to form a resonator and to partition incident light signal into multiple components which have bandwidth equal to the free spectral range of the resonator to measure spectral content of the incident light signal.

In yet another example aspect, a free-space non-scanning Fourier transform spectrometer apparatus is provided to perform non-scanning, Fourier transform.

The above and other aspects of the disclosed technology and their implementations are described in greater detail in the drawings, the description and the claims.

BRIEF DESCRIPTION OF THE DRAWINGS

FIG. 1 shows an exemplary structure of a Fourier transform spectrometer in a Mach-Zehnder interferometer configuration.

DETAILED DESCRIPTION

Figure 2:
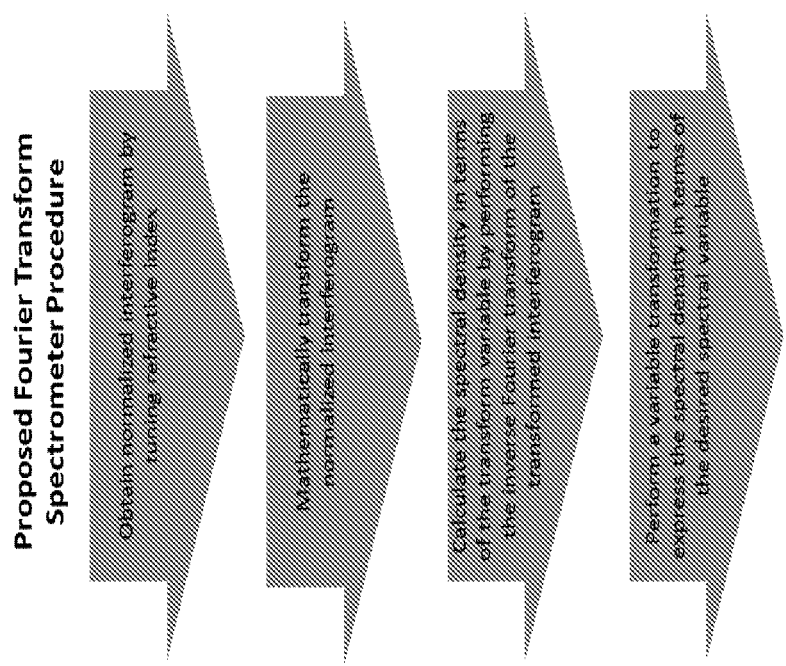
FIG. 2 shows an example of the operation of a Fourier transform spectrometer shown in FIG. 1.

Techniques, systems, and devices are described to analyze the spectral composition of a light signal. The disclosed devices provide various implementations of a spectrometer in compact or integrated configurations for various applications. The disclosed technology can be implemented to achieve device miniaturization and to further achieve device stabilization since the reduced volume is easier to isolate from the environment. The suggested designs feature reduced power consumption because waveguide index tuning takes much less energy than the tuning methods employed in conventional spectrometers.

Several distinct techniques and corresponding apparatus are disclosed.

In some embodiments, a spectrometer device is provided including a Mach-Zehnder interferometer in which the refractive index in one of the device arms is tunable. The spectral content of the input signal can be determined from the transmittance of the device as a function of the variable refractive index. In some embodiments, a device includes distributed Bragg reflectors and a tunable index ring resonator. The input signal is partitioned using Bragg reflectors with a bandwidth equal to the free spectral range of the resonator. One ring resonator is paired with each Bragg stopband, and by tuning the ring resonators the spectral content of the input signal can be determined. In some embodiments, a device is provided in which the tunable ring resonators are replaced by tunable Bragg reflector resonators. This arrangement has advantages in terms of packing density and partition bandwidth. In some embodiments, a free-space non-scanning Fourier transform spectrometer, which is a device to measure a stationary (non-scanning) Fourier transform spectrum that introduces variable spectral dispersion to improve spectral resolution and relax dynamic range requirements on the detector, in the measured interferogram is disclosed.

Each of exemplary designs/technique to analyze the spectral composition will be discussed in more detail in the corresponding sections below.

First Exemplary Design: Fourier Transform Spectrometer

The disclosed technology includes a Fourier transform spectrometer based on a phase shifting mechanism that can facilitate device miniaturization and. The Fourier transform is an integral transform and can be executed by using efficient computer algorithms. The Fourier transform itself may be expressed in a number of equivalent ways. For example, the exponential version of the Fourier transform F of the function $f$ and its inverse transform $F^{-1}$ can be expressed the following forms:

$$\mathcal{F}[f(t)] = \hat{f}(\omega) = \int_{-\infty}^{\infty} f(t) \cdot \exp(-i \cdot \omega \cdot t) dt \quad \text{Eq. (1)}$$

$$\mathcal{F}^{-1}[\hat{f}(\omega)] = f(t) = \frac{1}{2 \cdot \pi} \int_{-\infty}^{\infty} \hat{f}(\omega) \cdot \exp(i \cdot \omega \cdot t) d\omega$$

The trigonometric version of the Fourier transform is expressed in terms of sine and cosine functions. The cosine version $F_C$ takes the following form:

$$\mathcal{F}_C[f(t)] = \hat{f}(\omega) = \int_0^{\infty} f(t) \cdot \cos(\omega \cdot t) dt \quad \text{Eq. (2)}$$

$$\mathcal{F}_C^{-1}[\hat{f}(\omega)] = f(t) = \frac{2}{\pi} \int_0^{\infty} \hat{f}(\omega) \cdot \cos(\omega \cdot t) d\omega$$

Likewise, the sine version $F_S$ takes the following form:

$$\mathcal{F}_S[f(t)] = \hat{f}(\omega) = \int_0^{\infty} f(t) \cdot \sin(\omega \cdot t) dt \quad \text{Eq. (3)}$$

$$\mathcal{F}_S^{-1}[\hat{f}(\omega)] = f(t) = \frac{2}{\pi} \int_0^{\infty} \hat{f}(\omega) \cdot \sin(\omega \cdot t) d\omega$$

The inverse transforms have been labeled as before. The different versions may be interchanged using Euler's formula and by considering the symmetry of the function being transformed.

Given an amplitude A, the frequency ν, and a phase factor ϕ, the electric field E at a single frequency may be written as:

$$E = A \cdot \cos(2 \cdot \pi \cdot v \cdot t + \phi) = \quad \text{EQ. (4)}$$

$$\frac{A}{2} \{\exp[i(2 \cdot \pi \cdot v \cdot t + \phi)] + \exp[-i(2 \cdot \pi \cdot v \cdot t + \phi)]\}$$

In a Mach-Zehnder interferometer, the input field can be divided between the two optical arms and thus acquire a distinct phase factor for each arm, and the output field will be a superposition of the fields coming out of the two optical arms represented by subscripts 1 and 2:

$$E_{out} = E_1 \cdot \cos(2 \cdot \pi \cdot v \cdot t + \phi_1) + E_2 \cdot \cos(2 \cdot \pi \cdot v \cdot t + \phi_2) = \quad \text{Eq. (5)}$$

$$\frac{E_1}{2} \{\exp[i(2 \cdot \pi \cdot v \cdot t + \phi_1)] + \exp[-i(2 \cdot \pi \cdot v \cdot t + \phi_1)]\} +$$

$$\frac{E_2}{2} \{\exp[i(2 \cdot \pi \cdot v \cdot t + \phi_2)] + \exp[-i(2 \cdot \pi \cdot v \cdot t + \phi_2)]\}$$

The optical intensity measured by an optical detector at the interferometer output Iout is proportional to the time average of the square of the electric field of the interferometer output:

$$I_{out} \propto \langle |E_{out}|^2 \rangle = \qquad \text{Eq. (6)}$$

$$\left\langle \left| \frac{E_1}{2} \{\exp[i(2 \cdot \pi \cdot v \cdot t + \phi_1)] + \exp[-i(2 \cdot \pi \cdot v \cdot t + \phi_1)]\} \right|^2 \right\rangle +$$

$$\left\langle \left| \frac{E_2}{2} \{\exp[i(2 \cdot \pi \cdot v \cdot t + \phi_2)] + \exp[-i(2 \cdot \pi \cdot v \cdot t + \phi_2)]\} \right|^2 \right\rangle +$$

$$\left\langle \frac{E_1 \cdot E_2}{2} \{\exp[i(4 \cdot \pi \cdot v \cdot t + \phi_1 + \phi_2)] + \right.$$

$$\exp[-i(4 \cdot \pi \cdot v \cdot t + \phi_1 + \phi_2)] +$$

$$\left. \exp[i(\phi_1 - \phi_2)] + \exp[-i(\phi_1 - \phi_2)]\} \right\rangle =$$

$$\langle E_1^2 \cdot \cos^2(2 \cdot \pi \cdot v \cdot t + \phi_1) \rangle + \langle E_2^2 \cdot \cos^2(2 \cdot \pi \cdot v \cdot t + \phi_2) \rangle +$$

$$\langle E_1 \cdot E_2 [\cos(4 \cdot \pi \cdot v \cdot t + \phi_1 + \phi_2) + \cos(\phi_1 - \phi_2)] \rangle =$$

$$\frac{E_1^2}{2} + \frac{E_2^2}{2} + E_1 \cdot E_2 \cos(\phi_1 - \phi_2)$$

The time averaging operation is indicated here by the angular brackets. The output intensity can be represented by the optical intensities in the two optical arms $I_1$ and $I_2$:

$$I_{tot} = \int_0^\infty \frac{\rho_1(v)}{2} dv + \int_0^\infty \frac{\rho_2(v)}{2} dv + \qquad \text{Eq. (8)}$$

$$\int_0^\infty \sqrt{\rho_1(v)\rho_2(v)} \cos[\phi_1(v) - \phi_2(v)] dv$$

$$I_{tot} = I_{DC} + \int_0^\infty \rho_{tot}(v) \cos[\Delta \phi(v)] dv$$

$$I_{DC} = \int_0^\infty \frac{\rho_1(v)}{2} dv + \int_0^\infty \frac{\rho_2(v)}{2} dv$$

$$\rho_{tot}(v) = \sqrt{\rho_1(v)\rho_2(v)}$$

$$\Delta \phi(v) = \phi_1(v) - \phi_2(v)$$

The above output intensity of the interferometer is for a single input optical frequency. The case of multiple frequencies is more complex where the total output intensity are the sum of optical output intensities at different frequencies incident on the interferometer, which will interfere differently. The expression for the output intensity with input at different optical frequencies may be obtained from the single frequency case of Equation (7) by replacing each single frequency intensity with a frequency dependent intensity density ρ, and then integrating the expression over all frequencies to obtain the total output intensity Itot:

$$I_{tot}(\Delta L) - I_{DC} = \int_0^\infty \rho_{tot}(k) \cos(k \cdot \Delta L) dk \qquad \text{Eq. (10)}$$

The choice of frequency as a spectral variable in Equation (8) may be replaced by another spectral variable such as wavelength or wavenumber.

In some implementations of the Fourier transform spectrometer in a Mach-Zehnder interferometer configuration, the physical length of one of the arms can be varied to introduce a phase shift to analyze different spectral components in the input optical signal. In operation, an unknown optical signal is introduced into the spectrometer to produce an interferogram by plotting the total intensity of Equation (8) as a function of the variable arm length. When the phase shift term is evaluated explicitly, the arm length is used to act as a conjugate variable to the wavenumber in the argument of the cosine to produce a Fourier transform. The interferogram represents the Fourier transform of the unknown input spectra. Consequently the unknown input spectra may be determined by the inverse Fourier transform of the interferogram.

This is easily seen when the phase shift is expressed in terms of wavenumber k (also known as propagation constant), and the change in the arm length ΔL between the two optical arms:

$$\Delta\phi(k, \Delta L) = k \cdot \Delta L \qquad \text{Eq. (9)}$$

Next, substitution of the above phase shift into Equation (8) by using the wavenumber as the spectral variable yields the following Fourier cosine transform:

$$I_{tot}(\Delta k) - I_{DC} = \int_0^\infty \rho_{tot}(k) \cos(\Delta k \cdot L) dk \qquad \text{Eq. (12)}$$

The value of the unknown spectral intensity density may therefore be calculated by performing the inverse transform on the left hand side of the expression, which can be obtained from the interferogram (specifically by subtracting a constant value such that the interferogram oscillations occur about zero). Technically, the determination of the absolute spectral intensity density also requires knowledge of the splitting fraction between the interferometer arms, however this is a known quantity that is determined by the components used to construct the interferometer.

FIG. 1 depicts an exemplary Fourier transform spectrometer of the disclosed technology by using an index-varying mechanism to cause the relative phase shift between the two optical arms for the Fourier transform operation without changing the physical length of any of the two optical arms.

FIG. 1B in FIG. 1 depicts the operation of a Mach-Zender interferometer in which the refractive index in one of the device arms is tunable. The interferometer operates by splitting an incident optical field, propagating the split fields along two separate optical paths, and finally recombining them at the output such that they will constructively or destructively interfere depending on the phase difference between the two paths. This interference is generally wavelength dependent, and can be tuned between constructive and destructive by changing the refractive index of one of the interferometer arms to infer the spectral composition of the input signal from the total output power as a function of changing refractive index using a mathematical transform.

This design can be used to overcome the technical difficulties in connection with a physically rigid design of the interferometer based on changing a physical length of an optical arm and minimization of such a device, e.g., the conflict between device miniaturization and the spectral resolution in connection with the change in the physical length. The compact Fourier transform interferometer based on by using an index-varying mechanism to cause the relative phase shift between the two optical arms for the Fourier transform operation can retain and offer additional advantages, including superior signal-to-noise ratio since all of the power is focused on a single detector and a superior spectral resolution based on the index-based phase shift when compared to dispersive designs.

Specifically, as illustrated in FIG. 1A, this Fourier transform spectrometer uses an index tuning element in at least one interferometer arm with a tunable refractive index to change the index for a desired phase shift between the optical arms. The tunable refractive index can be implemented by placing an index tuning region under one optical arm, such as a layer or region of a material exhibiting a thermo-optic effect (temperature dependent refractive index change) or the free carrier dispersion effect (charge carrier concentration dependent refractive index change). A control circuit is coupled to the an index tuning region to change the index, causing a relative phase shift between the two optical arms. The interferometer operates by using a waveguide splitter to split an incident optical field into two split optical beams, propagating the split fields along two separate optical paths in the two optical arms, and using a waveguide combiner or coupler for recombining them at the output such that they will constructively or destructively interfere depending on the phase difference between the two paths. This interference can be tuned between constructive and destructive by changing the refractive index of one or both of the interferometer optical arms. The spectral composition of the input signal can be inferred from the total output power as a function of the changing refractive index.

The suggested Fourier transform spectrometer induces a phase shift in the interferometer to change the wavenumber for the Fourier transform operation while leaving the arm length constant. In an integrated device, this could be accomplished by changing the refractive index of one of the interferometer arms based on a number of mechanisms, such as the thermo-optic effect (temperature dependent refractive index change), or the free carrier dispersion effect (charge carrier concentration dependent refractive index change). The behavior of such an interferometer can be determined by deriving the equivalents of Equations (9) and (10) that describe the behavior of the conventional design. In this case the phase shift may be written as:

$$\Delta\phi(\Delta k, L) = \Delta k \cdot L \qquad \text{Eq. (11)}$$

Likewise, to obtain the interferometer response substitute this phase shift into the version of Equation (8) in which wavenumber has been used the spectral variable:

$$I_{tot}(T) = I_{DC} + \int_0^\infty \rho_{tot}(v)\cos[\Delta\phi(v, T)]dv \qquad \text{Eq. (13)}$$

Unlike the conventional design, the expression of Equation (12) for the device using the new phase shift mechanism cannot be readily identified with a Fourier transform. This difference arises because the variable of integration does not appear explicitly in the argument of the cosine.

The expression in Equation (12) may be perceived as discouraging the design shown in FIG. 1 as a practical design since there is no guarantee that a solution exists, and, even if the problem is solvable, there is no guarantee that the solution is unique. Furthermore, even if a unique solution does exist, it is not guaranteed that the calculation will be computationally efficient. In spite of the poor outlook, this patent document proposes a Fourier transform spectrometer based on the phase shift in FIG. 1. In implementations, a signal processor is provided for the device in FIG. 1 to perform the Fourier transform processing.

FIG. 2 shows operations of the signal processor in the new Fourier transform spectrometer shown in FIG. 1. In the conventional the conventional Fourier transform spectrometer based on changing a physical length of one optical arm, a normalized interferogram is obtained by tuning an arm length and the inverse Fourier transform of the normalized interferogram is performed to calculate a spectral density. Unlike the conventional Fourier transform spectrometer, the device in FIG. 1 performs the Fourier transform functions by using a variable transform and obtaining a normalized interferogram by tuning a refractive index. The normalized interfrogram is mathematically transformed. The spectral density is calculated in terms of the transform variable by performing the inverse Fourier transform of the transformed interferogram. The variable transformation is performed to express the spectral density in terms of the desired spectral variable. In the new variable space, the problem can be easily solved, and then the answer can be transformed back into the original space. The detailed method of obtaining the inverse transform from the Fourier transform spectrometer in FIG. 1 is described below.

First Order Response

In implementing the design in FIG. 1, the phase shift may be truncated to first order in tuning the phase shift. The general response of the interferometer when subject to a phase shift induced by a tuning parameter T may be obtained by explicitly incorporating the parameter into Equation (13):

$$\Delta\phi(v, T) = n(v, T_0) \cdot \frac{2\pi}{c} \cdot v \cdot L(T_0) - n(v, T) \cdot \frac{2\pi}{c} \cdot v \cdot L(T) \qquad \text{Eq. (14)}$$

The phase difference between the two arms may be expressed as:

$$n(v, T_0) \approx n(v_0, T_0) + \frac{\partial n}{\partial v} \cdot (v - v_0) \qquad \text{Eq. (15)}$$

$$n(v, T) \approx n(v_0, T_0) + \frac{\partial n}{\partial v} \cdot (v - v_0) + \frac{\partial n}{\partial T} \cdot (T - T_0)$$

$$L(T) \approx L(T_0) + \frac{\partial L}{\partial T} \cdot (T - T_0)$$

where n is the effective index, L is arm length, and c is the speed of light. The variable To is the ambient value of the tuning parameter at which the first arm is held, while the second arm is tuned. Numerical subscripts identify interferometer arm as before. The assumption is made that the interferometer arms are symmetric in the ambient state because this greatly simplifies the algebra. It would be noted, however, that this same procedure is applicable to asymmetric interferometers, which are also suitable for this type of spectrometer. Next, expand the variable quantities as first order in Taylor series:

$$\Delta\phi(v, T) \approx -\frac{2\pi}{c} \cdot v \cdot (T - T_0) \left[ n(v_0, T_0) \cdot \frac{\partial L}{\partial T} + \frac{\partial n}{\partial T} \cdot L(T_0) \right] \qquad \text{Eq. (16)}$$

Note that the partial derivatives need to be evaluated around v0 and $T_o$. Substitute these results into the phase difference of Equation (14) and retain only the first order terms.

$$I_{tot}(T) = I_{DC} + \int_0^\infty \rho_{tot}(v)\cos \qquad \text{Eq. (137)}$$

$$\left\{ -\frac{2\pi}{c} \cdot v \cdot (T - T_0) \left[ n(v_0, T_0) \cdot \frac{\partial L}{\partial T} + \frac{\partial n}{\partial T} \cdot L(T_0) \right] \right\} dv$$

The first order interferogram response is obtained by substituting the approximation of Equation (16) into the general expression of Equation (13):

$$I_{tot}(\psi) - I_{DC} = \int_0^\infty \rho_{tot}(\nu)\cos\{\nu \cdot \psi\}d\nu \quad \text{Eq. (18)}$$

$$\psi = \frac{-2\pi \cdot (T - T_0)}{c}\left[n(\nu_0, T_0) \cdot \frac{\partial L}{\partial T} + \frac{\partial n}{\partial T} \cdot L(T_0)\right]$$

To recognize Equation (17) as a Fourier cosine transform perform the following variable substitution:

$$I_{tot}(\psi) - I_{DC} = \int_0^\infty \rho_{tot}(\nu)\cos\{\nu \cdot \psi\}d\nu \quad \text{Eq. (19)}$$

$$\rho_{tot}(\nu) = \frac{2}{\pi}\int_0^\infty [I_{tot}(\psi) - I_{DC}]\cos\{\nu \cdot \psi\}d\psi$$

Consequently the desired spectral intensity distribution may be solved by the inverse transform:

$$\Delta\phi(\nu, T) \approx \Delta\phi(\nu_0, T_0) + \frac{\partial \Delta\phi}{\partial \nu} \cdot (\nu - \nu_0) + \quad \text{Eq. (22)}$$

$$\frac{\partial \Delta\phi}{\partial T} \cdot (T - T_0) + \frac{1}{2} \cdot \frac{\partial^2 \Delta\phi}{\partial \nu^2} \cdot (\nu - \nu_0)^2 +$$

$$\frac{1}{2} \cdot \frac{\partial^2 \Delta\phi}{\partial T \partial \nu} \cdot (\nu - \nu_0)(T - T_0) + \frac{1}{2} \cdot \frac{\partial^2 \Delta\phi}{\partial T^2} \cdot (T - T_0)^2$$

Given the assumption of a symmetric interferometer, the spectral density in the interferometer arms is as follows:

$$\rho_{tot}(\nu) = \rho_1(\nu) = \rho_2(\nu) \quad \text{Eq. (20)}$$

For ideal couplers and splitters that operate independent of wavelength, the arm spectral density will be the same as that of the input. In reality, waveguide components tend to have some wavelength dependence, such that the arm spectral density will be equal to the input spectral density multiplied by a wavelength dependent transfer function G:

$$\rho_1(\nu) = \rho_2(\nu) = G(\nu)\rho_{in}(\nu) \quad \text{Eq. (21)}$$

The quantities for determining the input spectra from the interferogram are therefore the partial derivatives in Equation (15), and the transfer function from Equation (21). If the device dimensions are known with sufficient accuracy these may be determined by numerical simulation. However, the device dimensions may also be determined experimentally using the following procedures. The transfer function may be determined experimentally by inputting a known broadband source and comparing it with the measured arm spectral density. The T variable partial derivative may be determined by inputting a narrowband input (that behaves like a single frequency input), and measuring the period of the interferogram as the parameter T is tuned. The $\nu$ variable partial derivative may be determined by holding T constant, characterizing the transmittance of multiple narrowband inputs, and measuring the period of the transmitted power as a function of ($\nu$). Once these quantities are determined the spectrometer output can be fully calibrated.

Second Order Response

Circumstances might occur in which it is not possible to engineer the waveguide interferometer with a purely linear response as the first order response for the device shown in FIG. 1. The device in FIG. 1 can be operated based on second order terms when taking a Taylor series of the interferometer phase mismatch to obtain an expression for the spectra as a transform of the interferogram. The Taylor expansion of the entire phase mismatch can be expressed as follows:

$$\Delta\phi(\nu_0, T_0) = 0 \quad \text{Eq. (23)}$$

$$\frac{\partial \Delta\phi}{\partial \nu} = 0$$

$$\frac{\partial \Delta\phi}{\partial T} = -\frac{2\pi}{c} \cdot \nu_0 \cdot \left[\frac{\partial n}{\partial T} \cdot L(T_0) + n(\nu_0, T_0) \cdot \frac{\partial L}{\partial T}\right]$$

$$\frac{\partial^2 \Delta\phi}{\partial \nu^2} = 0$$

$$\frac{\partial^2 \Delta\phi}{\partial T \partial \nu} = -\frac{2\pi}{c}\left[\frac{\partial n}{\partial T} \cdot L(T_0) + \right.$$

$$\left. n(\nu_0, T_0) \cdot \frac{\partial L}{\partial T} + \nu_0 \cdot \frac{\partial^2 n}{\partial T \partial \nu} \cdot L(T_0) + \nu_0 \cdot \frac{\partial n}{\partial \nu} \cdot \frac{\partial L}{\partial T}\right]$$

$$\frac{\partial^2 \Delta\phi}{\partial T^2} = -\frac{2\pi}{c} \cdot \nu_0 \cdot \left[\frac{\partial^2 n}{\partial T^2} \cdot L(T_0) + 2 \cdot \frac{\partial n}{\partial T} \cdot \frac{\partial L}{\partial T} + n(\nu_0, T_0) \cdot \frac{\partial^2 L}{\partial T^2}\right]$$

The partial derivatives are evaluated around $\nu_0$ and $T_0$. Taking the explicit expression for phase shift in Equation (14), the individual terms are be evaluated as follows:

$$\Delta\phi(\nu, T) \approx \alpha \cdot \Delta T + \beta \cdot \Delta T \cdot (\nu - \nu_0) + \gamma \cdot \Delta T \cdot \Delta T \quad \text{Eq. (24)}$$

$$\Delta T = T - T_0$$

$$\alpha = -\frac{2\pi}{c} \cdot \nu_0 \cdot \left[\frac{\partial n}{\partial T} \cdot L(T_0) + n(\nu_0, T_0) \cdot \frac{\partial L}{\partial T}\right]$$

$$\beta = -\frac{\pi}{c}\left[\frac{\partial n}{\partial T} \cdot L(T_0) + n(\nu_0, T_0) \cdot \frac{\partial L}{\partial T} + \right.$$

$$\left. \nu_0 \cdot \frac{\partial^2 n}{\partial T \partial \nu} \cdot L(T_0) + \nu_0 \cdot \frac{\partial n}{\partial \nu} \cdot \frac{\partial L}{\partial T}\right]$$

$$\gamma = -\frac{\pi}{c} \cdot \nu_0 \cdot \left[\frac{\partial^2 n}{\partial T^2} \cdot L(T_0) + 2 \cdot \frac{\partial n}{\partial T} \cdot \frac{\partial L}{\partial T} + n(\nu_0, T_0) \cdot \frac{\partial^2 L}{\partial T^2}\right]$$

It is assumed that the interferometer arms are symmetric in the ambient state because this greatly simplifies the algebra. Again it needs to be noted that this same procedure is applicable to asymmetric interferometers, which are also suitable for this type of spectrometer.

The phase mismatch may be expressed explicitly by substituting Equation (23) into Equation (22):

$$I_{tot}(\Delta T) = \quad \text{Eq. (15)}$$

$$I_{DC} + \int_0^\infty \rho_{tot}(\nu)\cos[\alpha \cdot \Delta T + \beta \cdot \Delta T \cdot (\nu - \nu_0) + \gamma \cdot \Delta T \cdot \Delta T]d\nu$$

The second order interferogram response is obtained by substituting the approximation of Equation (17) into the general expression of Equation (6) as follows:

$$I_{tot}(\Delta T) - I_{DC} + I_{tot}(-\Delta T) - I_{DC} = \quad \text{Eq. (26)}$$

$$\int_0^\infty \rho_{tot}(\nu)\{\cos[\alpha \cdot \Delta T + \beta \cdot \Delta T \cdot (\nu - \nu_0) + \gamma \cdot \Delta T \cdot \Delta T] +$$

$$\cos[-\alpha \cdot \Delta T - \beta \cdot \Delta T \cdot (\nu - \nu_0) + \gamma \cdot \Delta T \cdot \Delta T]\}d\nu =$$

-continued $$\int_0^\infty \rho_{tot}(\nu) \cdot 2 \cdot \cos[\gamma \cdot \Delta T \cdot \Delta T]$$

$$\cos[\alpha \cdot \Delta T + \beta \cdot \Delta T \cdot (\nu - \nu_0)]d\nu$$

$$\frac{I_{tot}(\Delta T) + I_{tot}(-\Delta T) - 2 \cdot I_{DC}}{2 \cdot \cos(\gamma \cdot \Delta T \cdot \Delta T)} =$$

$$\int_0^\infty \rho_{tot}(\nu)\cos(\alpha \cdot \Delta T - \beta \cdot \Delta T \cdot \nu_0 + \beta \cdot \Delta T \cdot \nu)d\nu$$

Unlike the linear case, the desired transform operation is not apparent. The above expression can be rearranged based on trigonometric identities as follows:

$$\frac{I_{tot}(\Delta T) + I_{tot}(-\Delta T) - 2 \cdot I_{DC}}{2 \cdot \cos(\gamma \cdot \Delta T \cdot \Delta T)} = \quad \text{Eq. (167)}$$

$$\cos[(\alpha - \beta \cdot \nu_0) \cdot \Delta T] \int_0^\infty \rho_{tot}(\nu)\cos(\beta \cdot \Delta T \cdot \nu)d\nu -$$

$$\sin[(\alpha - \beta \cdot \Delta T \cdot \nu_0) \cdot \Delta T] \int_0^\infty \rho_{tot}(\nu)\sin(\beta \cdot \Delta T \cdot \nu)d\nu$$

Next the argument of the cosine can be decomposed:

$$\beta \cdot \frac{I_{tot}(\Delta T) + I_{tot}(-\Delta T) - 2 \cdot I_{DC}}{2 \cdot \cos(\gamma \cdot \Delta T \cdot \Delta T)} = \quad \text{Eq. (178)}$$

$$\cos[(\alpha - \beta \cdot \nu_0) \cdot \Delta T] \int_0^\infty \rho_{tot}(\xi)\cos(\Delta T \cdot \xi)d\xi -$$

$$\sin[(\alpha - \beta \cdot \Delta T \cdot \nu_0) \cdot \Delta T] \int_0^\infty \rho_{tot}(\xi)\sin(\Delta T \cdot \xi)d\xi$$

Therefore, a variable transform can be preformed to rescale the frequency:

$$\beta \cdot \frac{I_{tot}(\Delta T) + I_{tot}(-\Delta T) - 2 \cdot I_{DC}}{\cos(\gamma \cdot \Delta T \cdot \Delta T)} = \quad \text{Eq. (189)}$$

$$\cos[(\alpha - \beta \cdot \nu_0) \cdot \Delta T] \int_{-\infty}^\infty \rho_{even}(\xi)\exp(-i \cdot \Delta T \cdot \xi)d\xi -$$

$$\sin[(\alpha - \beta \cdot \Delta T \cdot \nu_0) \cdot \Delta T] \cdot i \cdot \int_{-\infty}^\infty \rho_{odd}(\xi)\exp(-i \cdot \Delta T \cdot \xi)d\xi$$

$$\rho_{even}(\xi) = \begin{cases} \rho_{tot}(\xi), \xi \geq 0 \\ \rho_{tot}(-\xi), \xi < 0 \end{cases}$$

$$\rho_{odd}(\xi) = \begin{cases} \rho_{tot}(\xi), \xi \geq 0 \\ -\rho_{tot}(-\xi), \xi < 0 \end{cases}$$

At this point the integrals are clearly identifiable as sine and cosine transforms. However, the derivation is greatly simplified by converting these to the exponential form of Fourier transform. This is done by defining even and odd extensions of the spectral density function, and using these to extend the integrals to negative infinity as follows:

$$\beta \cdot \frac{I_{tot}(\Delta T) + I_{tot}(-\Delta T) - 2 \cdot I_{DC}}{-\sin\left[\left(\frac{\alpha - \beta \cdot}{\Delta T \cdot \nu_0}\right) \cdot \Delta T\right]} = -\cot[(\alpha - \beta \cdot \nu_0) \cdot \Delta T] \quad \text{Eq. (190)}$$

$$\cos\left(\frac{\gamma \cdot \Delta T \cdot}{\Delta T}\right)$$

$$\int_{-\infty}^\infty \rho_{even}(\xi)\exp(-i \cdot \Delta T \cdot \xi)d\xi +$$

$$i \cdot \int_{-\infty}^\infty \rho_{odd}(\xi)\exp(-i \cdot \Delta T \cdot \xi)d\xi$$

The next simplification involves rearranging Equation (22) and exploiting the symmetry properties of the Fourier transform. Begin as follows:

$$\rho_{odd}(\xi) = \int_{-\infty}^\infty \beta \cdot \frac{I_{tot}(\Delta T) + \frac{I_{tot}(-\Delta T) - 2 \cdot I_{DC}}{-i \cdot 2 \cdot \pi \cdot \sin}}{\cos(\gamma \cdot \Delta T \cdot \Delta T)} \exp(i \cdot \Delta T \cdot \xi)d\Delta T \quad \text{Eq. (31)}$$

The Fourier transform of a function with even or odd parity retains that parity. Since the cotangent function is odd, when the inverse Fourier transform is applied to the above expression the integral of the term containing the cotangent will vanish since the symmetrical integral of an even function multiplied by an odd function is identically zero. Consequently, the following expression is obtained:

$$\Gamma(\tau) = \Gamma_o(\tau)\cos(2\pi\nu_o\tau)rect\left(\frac{\tau}{T_o}\right) \leftrightarrow G(\nu) = G_o(\nu - \nu_o) * \text{sinc}(T_o\nu) \quad \text{Eq. (32)}$$

Therefore, the frequency spectrum may be obtained by performing a variable transformation to frequency on the appropriate portion of its odd extension from Equation (24). The parameters in the Taylor expansion may be determined either through numerical modelling, or experimentally in a manner similar to that described in the previous section.

Several design considerations are discussed below for this design. First, it is noted that the ideal interferometer will have arms of equal length, identical input and output couplers (if applicable), and identical splitters that divide the input signal equally between each arm. The reason for this it that it will maximize the dynamic range of the interferogram, which will result in the greatest tolerance to noise. Note that a device with unequal arms and unequal splitters will still function, however. Second, it should be noted that the spectral dependence of the couplers and splitters is imposed upon the measured spectra. This is simple to correct for, so long as the transmittance of these components does not vanish (otherwise the spectral frequencies for which it vanishes cannot be recovered). This naturally lends the device to certain types of components rather than others. For example, on one hand butt couplers and adiabatic splitters have the least amount of spectral dependence and are therefore preferable. On the other hand grating couplers and evanescent splitters operate only over narrow spectral bands and are therefore not preferable. In addition, the device can be made polarization independent using waveguides for which the TE-like and TM-like mode have the same effective index (such as square waveguides). This is because the interferogram for each mode will be identical.

The Fourier transform spectrometer in FIG. 1 can be configured in various manners. In some implementations, the Fourier transform spectrometer includes silicon-on-insulator (SOI) waveguides. In this case, the device is fabricated using standard complementary metal-oxide-semiconductor (CMOS) processing techniques on a 250 nm SOI substrate. In some implementations, the waveguide cladding material includes silicon dioxide. The index tuning may be performed using the thermo-optic effect. Resistive heating elements are employed that are composed nickel-chrome which overlays the interferometer arms.

Figure 3:
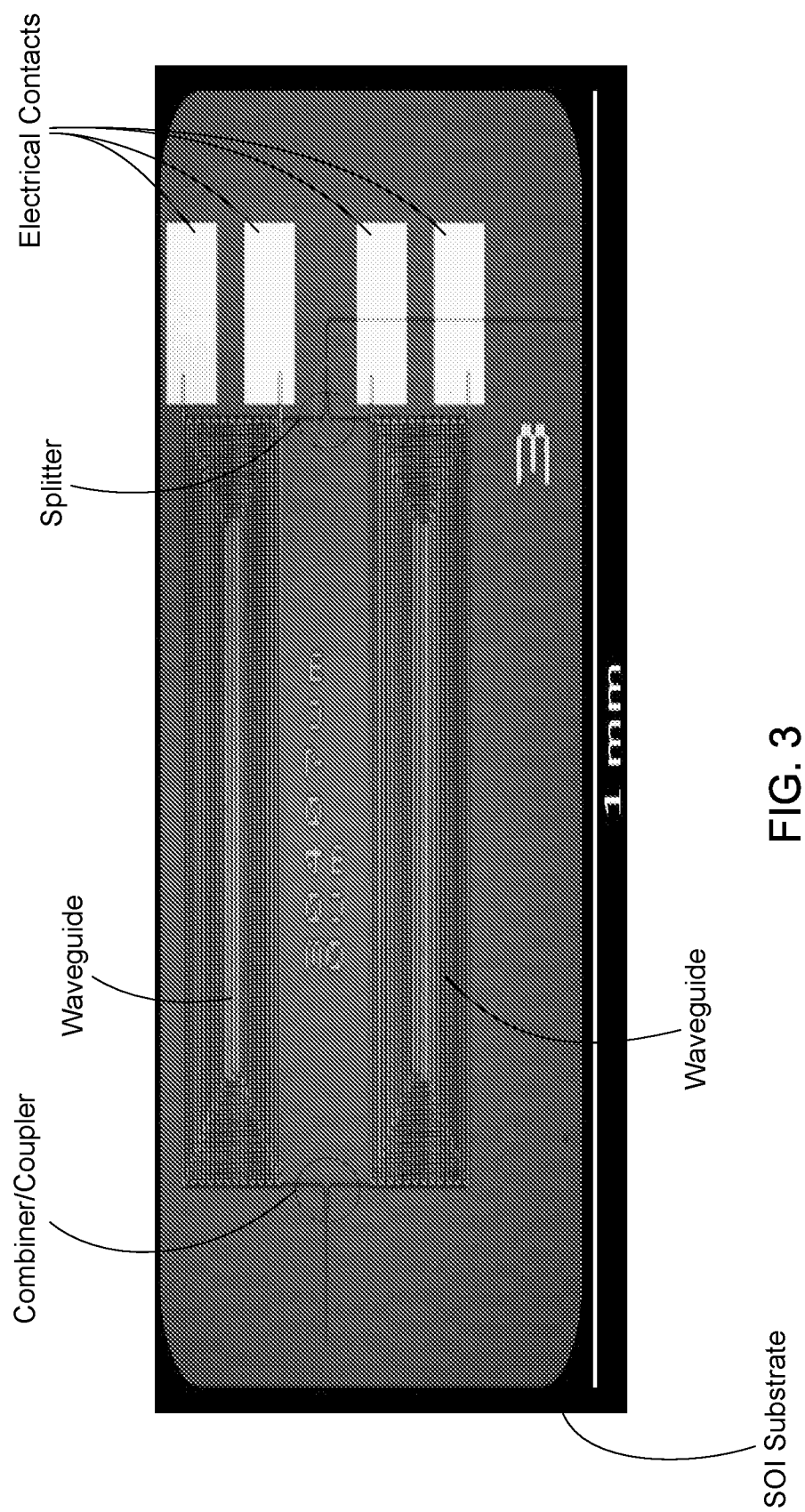
FIG. 3 shows an optical microscope image of an exemplary prototype Fourier transform spectrometer.

FIG. 3 shows an optical microscope image of an exemplary prototype Fourier transform spectrometer based on the design in FIG. 1. The optical waveguides are overlain by a resistive heater, which tunes the refractive index of the waveguide arms by the thermos-optic effect. The yellow rectangles are the electrical contacts of the heater. The area circled in red is one of the power splitters of the waveguide interferometer. In the exemplary device of FIG. 3, the interferometer arm length of the device is approximately 30 mm.

Figure 4:
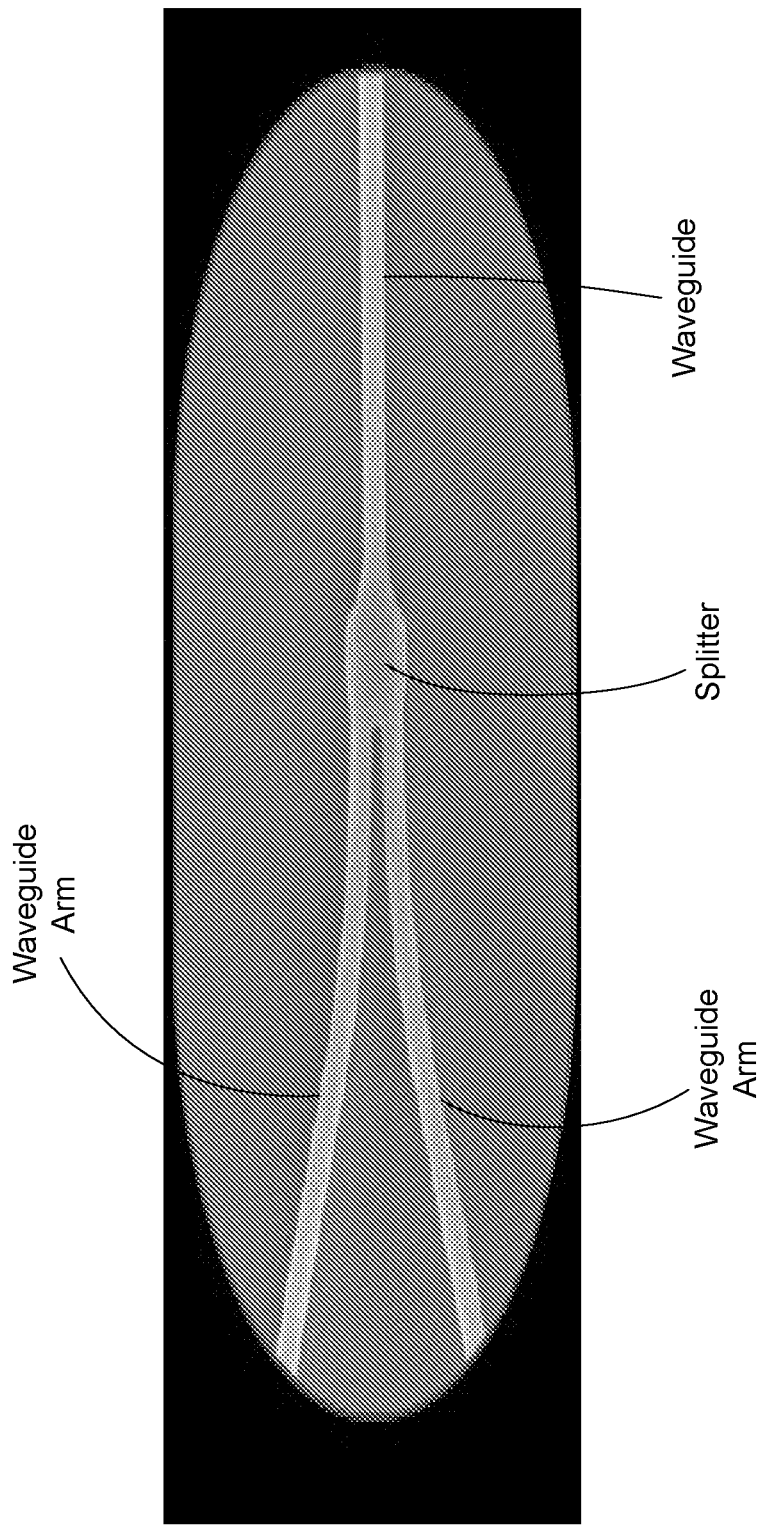
FIG. 4 shows an exemplary electron microscope image of interferometer splitters in a Fourier transform spectrometer.
Figure 5:
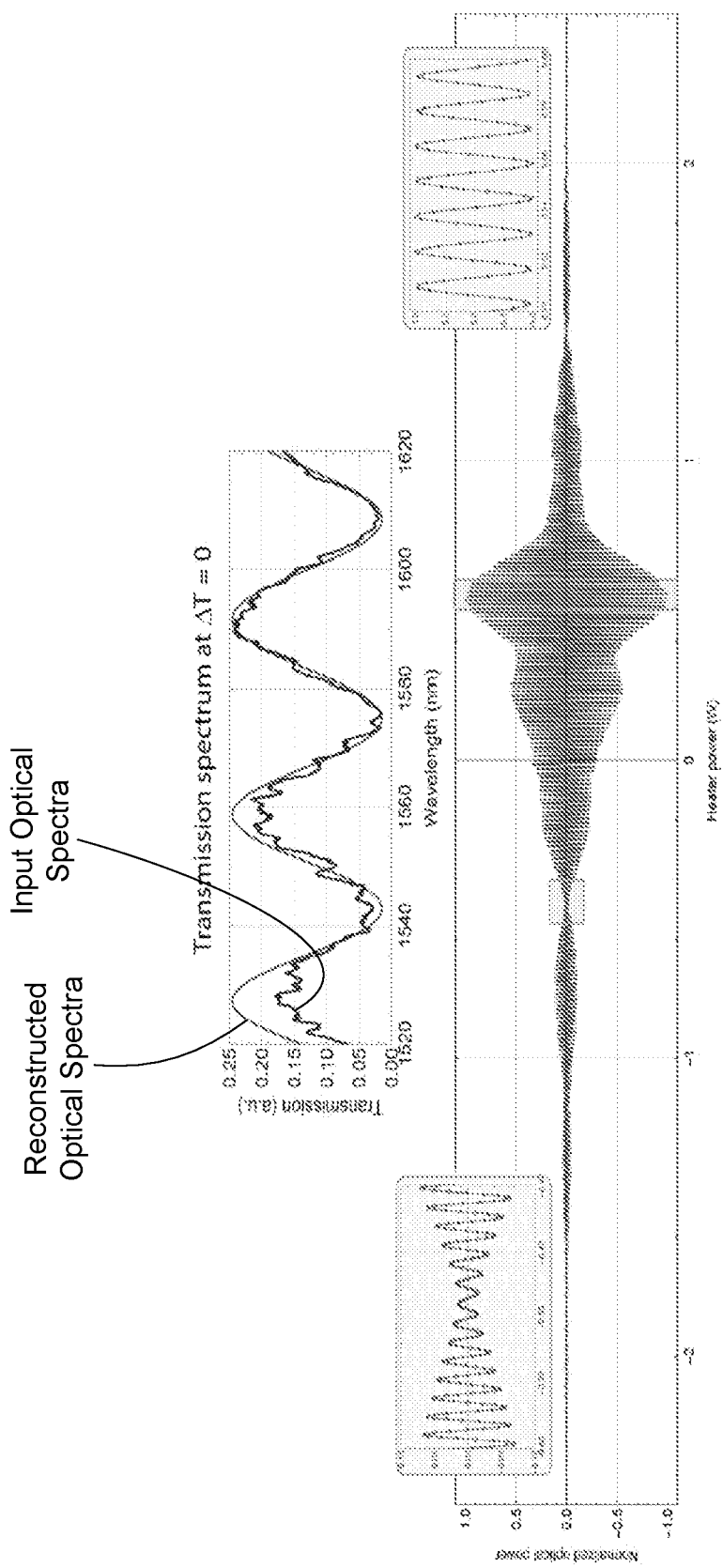
FIG. 5 illustrates experimentally measured interferogram results by an exemplary Fourier transform spectrometer.
Figure 6:
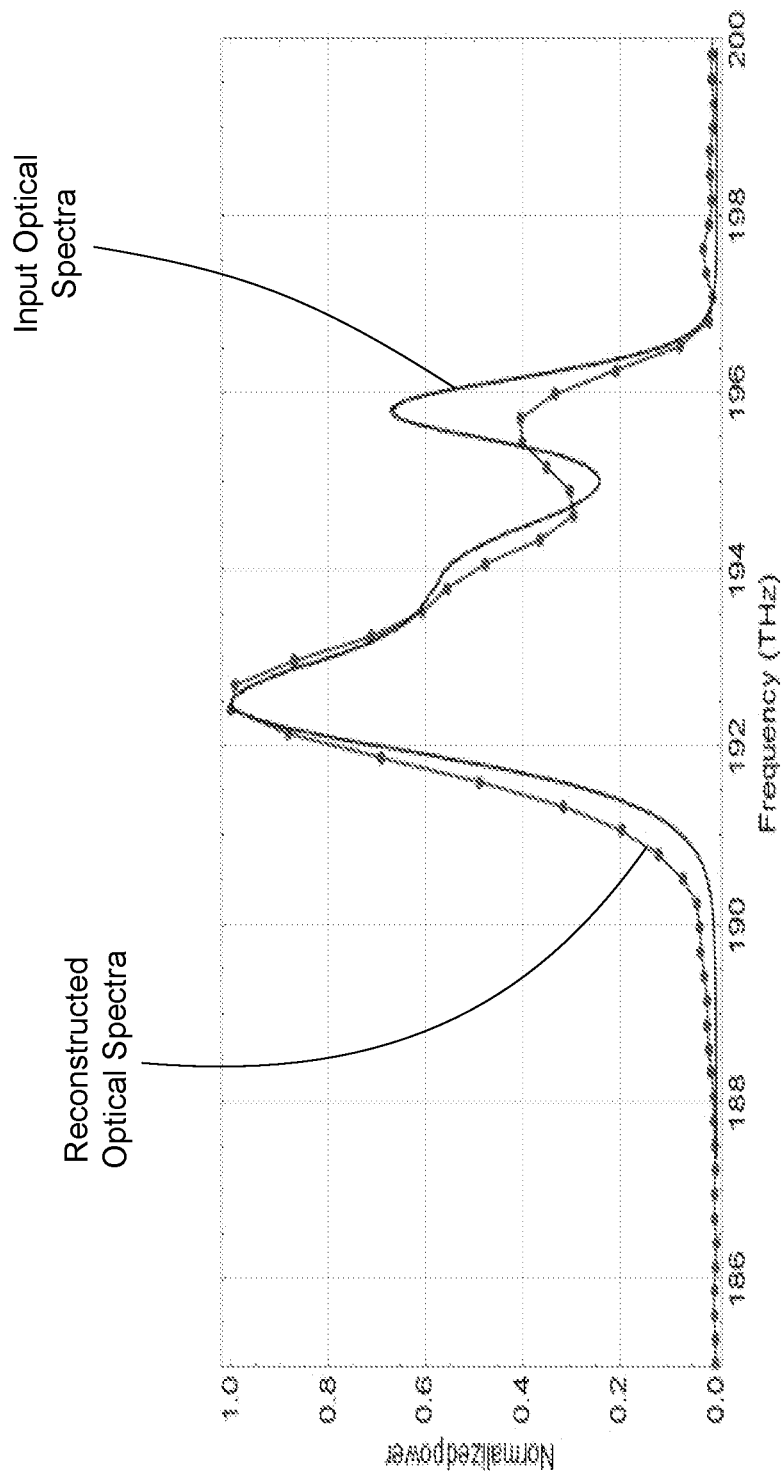
FIG. 6 illustrates an input and reconstructed optical spectra obtained by an exemplary Fourier transform spectrometer.

FIG. 4 shows an exemplary electron microscope image of an interferometer splitter in the circled area of FIG. 3 to minimize loss and reflectivity. The measured interferogram and spectral reconstruction are illustrated respectively in FIGS. 5 and 6. In FIG. 5, the horizontal axis is the heater power levels used in the measurements and thus corresponds to different values of index of refraction of each heated region. FIG. 6 shows the input and reconstructed optical spectra in blue and red, respectively. The reconstructed spectra corresponds very well with known input spectra and this demonstrates the successful operation of the Fourier transform interferometer operation. The small differences may be attributed to the wavelength dependence of the waveguide components, and minor fabrication imperfections. These may be corrected for using the calibration procedure described in the prior section.

Second and Third Exemplary Designs: Resonant Spectrometer Designs

Another class of conventional spectrometers employs designs based on optical resonant cavities. Generally speaking, optical resonators operate by using optical components such as lenses and beam splitters to repeatedly direct a beam across the same optical path known as a resonant cavity. The beams in the resonant cavity interact with each other, and for most wavelengths interfere destructively such that no light is transmitted through the resonator. However, a few wavelengths interfere destructively such that they are successfully transmitted through the resonator. These are known as resonant wavelengths, and subsequent resonant wavelengths are separated by the free spectral range (FSR). Due to the stringent conditions on their existence the resonance wavelengths have very narrow linewidths, which makes them ideal for spectroscopic analysis provided the FSR can be engineered to be wide enough that the spectra of interest will not overlap multiple resonance lines at once. In free space there are many degrees of design freedom available, and it is fairly easy to engineer a resonator with wide FSR while also leaving a way to tune the position of the resonance lines. This is the recipe of a successful resonant cavity spectrometer.

It would be desirable to miniaturize such a resonant spectrometer, because it would open up a lot of new application possibilities. The difficulty with this prospect is that in the context of integrated waveguides there are far fewer degrees of design freedom. This makes it difficult to replicate the successful designs used in free space systems. In this patent document, two novel designs for integrated spectrometers have been proposed and demonstrated, which can overcome these limitations. Broadly speaking they operate by using a filter to ameliorate the FSR problem, which creates enough extra design freedom that it is no longer problematic to tune the resonance line used for spectroscopic determination.

Ring-Grating Spectrometer

The second exemplary design provides a spectrometer where a tunable ring resonator is incorporated with a tunable distributed reflector (DBR) to analyze the spectral composition of a light signal.

Figure 7:
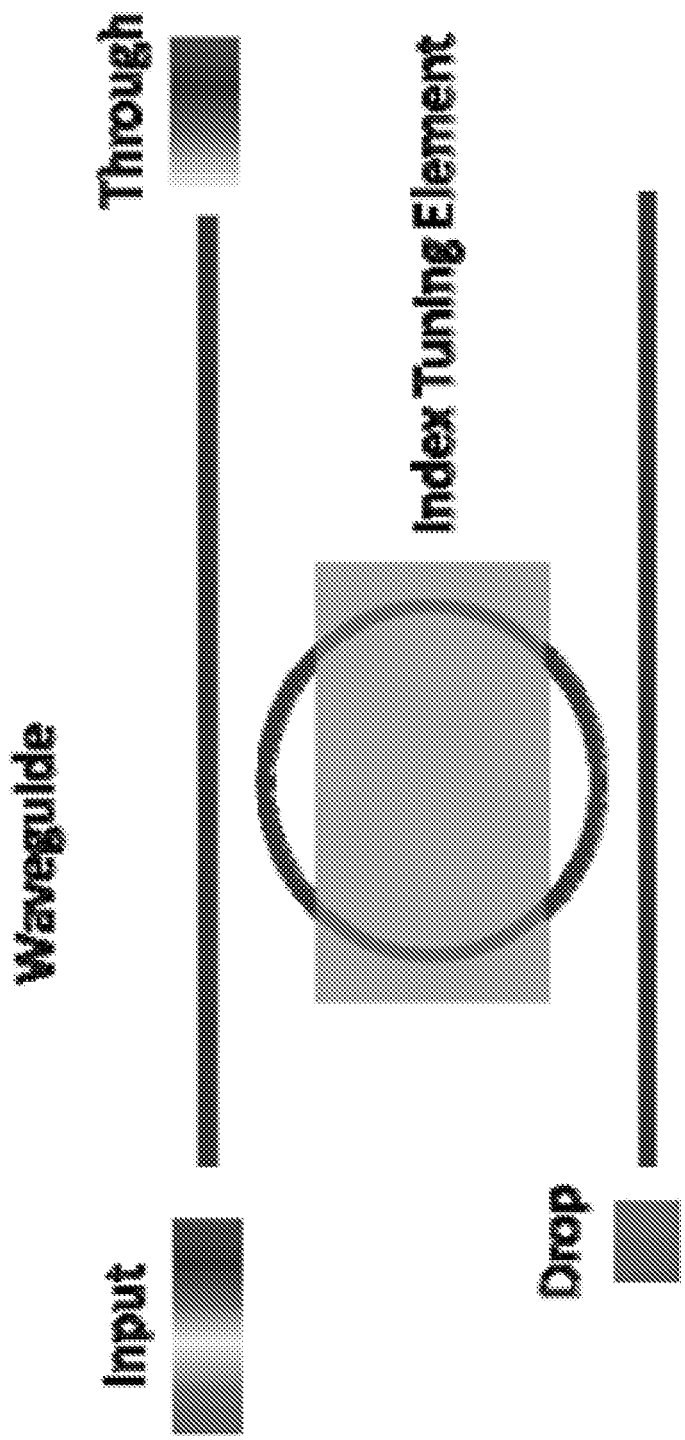
FIG. 7 shows an exemplary structure of a ring resonator based integrated spectrometer.

FIG. 7 show an example of a device that operates by partitioning the input signal using a series of broadband Bragg reflectors. The Bragg reflectors direct each spectral partition to a tunable ring resonator with a narrow resonance, and are designed to have a bandwidth equal to the free spectral range of a ring resonator. By tuning the ring resonators the spectral content of the input signal can be determined with high resolution. FIG. 7 shows the spectra of the input light and the output light after passing through the tunable ring resonator based integrated spectrometer where the ring resonator is tunable to change its resonance by an index tuning element which can include, e.g., an index changing region placed under the ring resonator.

Figure 8A:
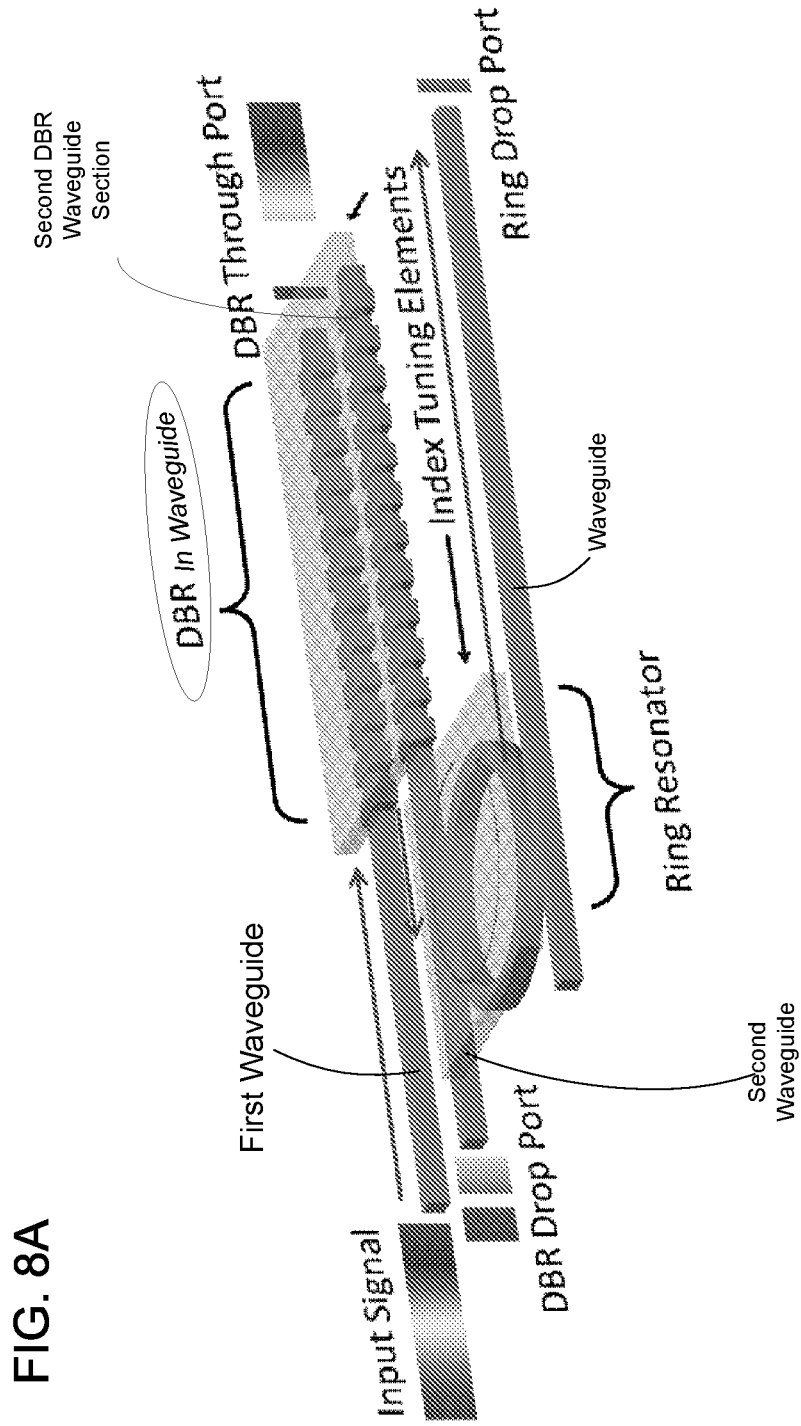
FIG. 8A shows an example schematic view of a ring resonator based integrated spectrometer formed over a substrate based on the design in FIG. 7.

FIG. 8A shows an example schematic view of a ring resonator based integrated spectrometer formed over a substrate based on the design in FIG. 7. Optical waveguides are formed over the substrate to construct an input optical waveguide that receives an optical signal incident on the device to be analyzed, a first DBR waveguide section formed in the input optical waveguide to reflect a selected spectral component in the optical signal based on the resonance condition of the first DBR waveguide section while transmitting the remaining spectral components on the other side of the first DBR waveguide section as the DBR through port, a second optical waveguide with a second DBR waveguide section placed adjacent to the input optical waveguide and optically coupled to the first DBR waveguide section. The first and second DBR waveguide sections form a tunable reflector to reflect a desired spectral component of the input light into the second waveguide which is optically coupled to the ring resonator (e.g., via evanescent coupling). An index tuning region is formed underneath the first DBR waveguide section and the second DBR waveguide section to tune their reflection resonance and thus the transmission. A control circuit such as a heating circuit is coupled to the index tuning region to cause the index of the index tuning region to change and the control circuit can be operated to change the resonance condition of the DBR waveguide sections. The DBR overcomes the FSR limitation of the device by acting as a filter that isolates a single spectral line. The DBR operates to partition off the input optical signal. The Bragg reflectors direct each spectral partition to a tunable ring resonator with a narrow resonance. In some implementations, the partition bandwidth of DBR is designed such that it only overlaps with a single resonance peak of the ring resonator. In some implementations, the DBR is designed to have a bandwidth equal to the free spectral range of a ring resonator.

The DBR directs each spectral partition to the tunable ring resonator. The tunable ring resonator can be configured in different ways. As illustrated, a ring resonator may be placed over another index tuning element and a control circuit is coupled this index turning element to tune the resonance of the ring resonator. As illustrated in FIG. 8A, a third optical waveguide is formed over the substrate and is optically coupled to the tunable ring resonator (e.g., via evanescent coupling) to receive the resonant light in the ring resonator to provide a ring resonator drop port. In operation, the spectral partition from the DBR reflectors is fed into the ring resonator which transmits a narrow portion of the signal into the third optical resonator to provide a suitable spectral analysis. The resonant cavity operates to provide high resolution spectral lines. By tuning positions of the ring resonance, the spectral content of the input signal can be determined with high resolution.

Figure 8B:
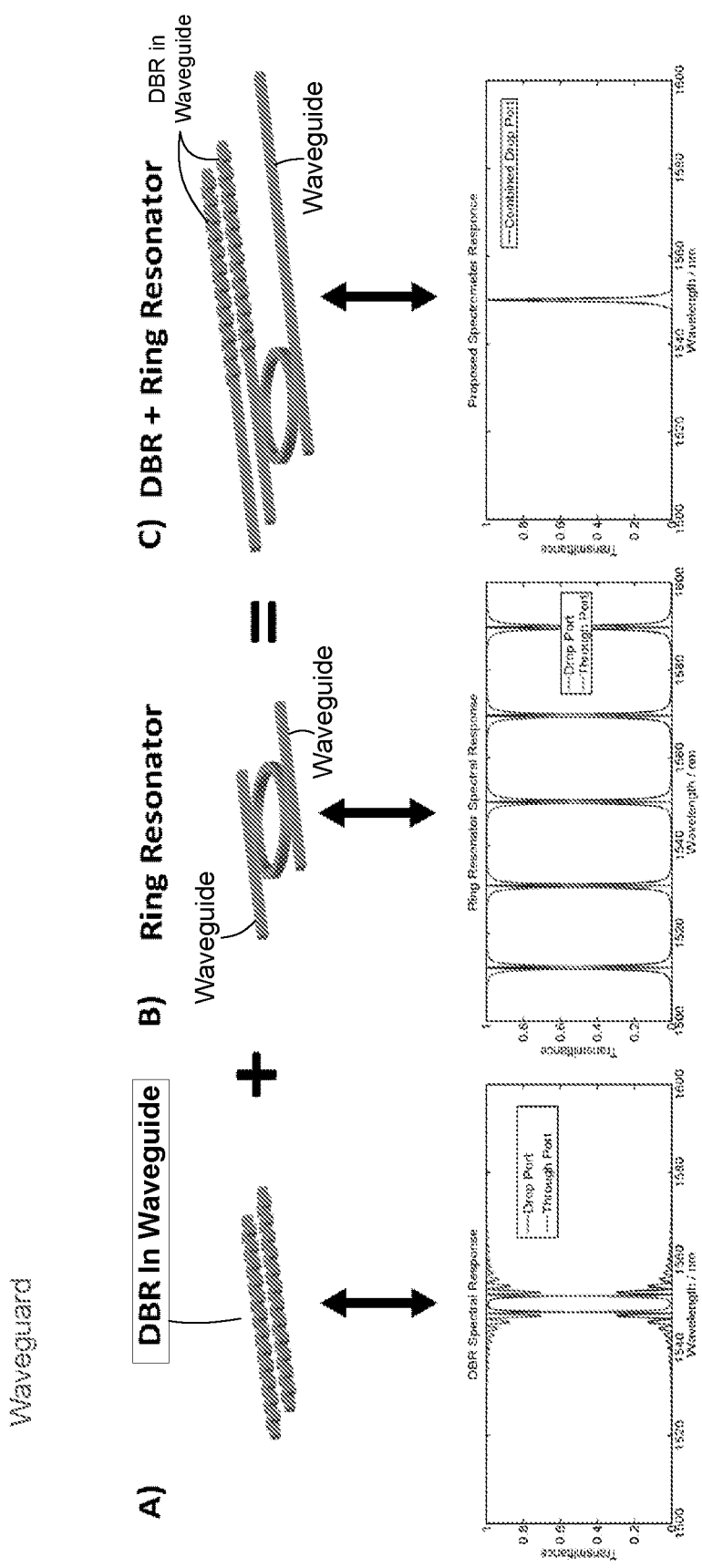
FIG. 8B shows spectral responses of the individual and combined components of the ring resonator based integrated spectrometer shown in FIG. 8A.

FIG. 8B further shows the spectral responses of the two DBR waveguide sections (Part A), the ring resonator (Part B) and the entire device in FIG. 8A (Part C). The DBR elements can similarly be tuned so that the center of their stopband coincides with the desired ring resonance. This novel combination of components overcomes the small free spectral range which is the primary limitation of resonant cavity based spectrometers (such as those based on Fabry-Perot resonators, for example). Furthermore, the fundamental device unit cell (illustrated in FIG. 8) can be stacked to cover additional spectral ranges. This can be done by centering each unit cell on a different wavelength such that the maximum range of one unit cell corresponds to the minimum range of the next unit cell. This is useful in the event that the maximum spectral range provided by the tuning mechanism is smaller than desired.

Figure 9:
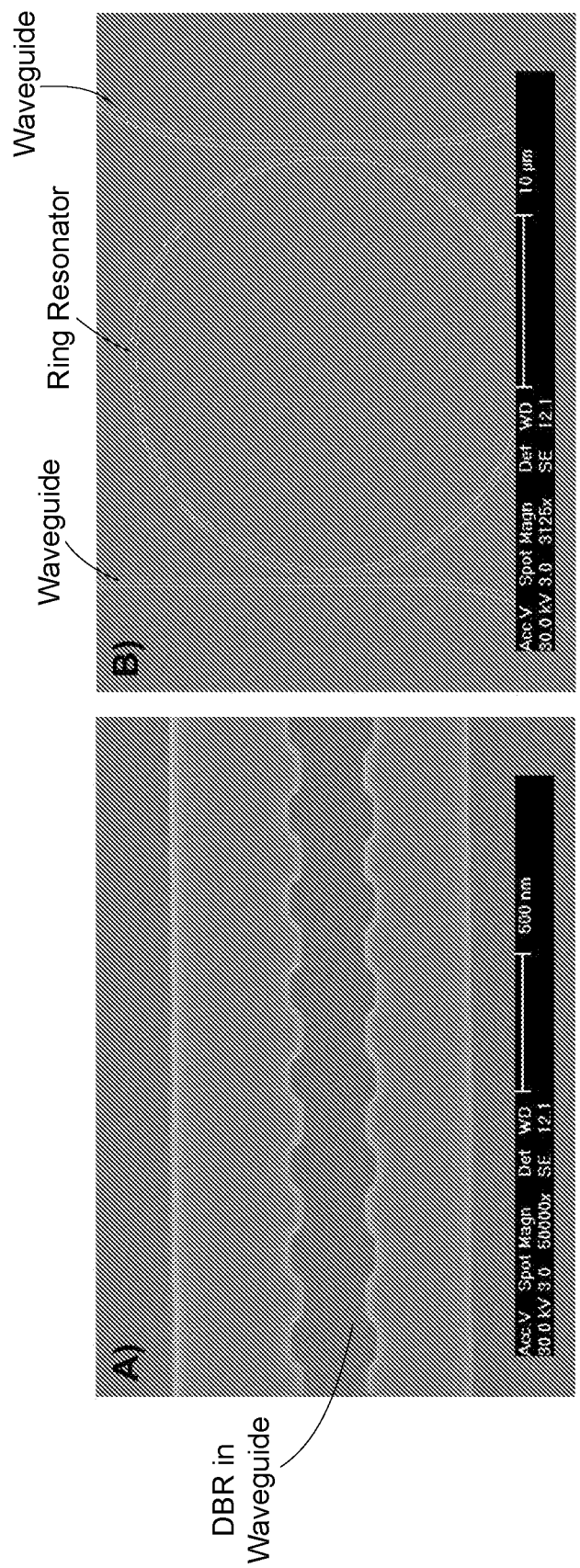
FIGS. 9a and 9b show electron microscope images of a DBR component and ring resonator component, respectively, of an exemplary ring-grating spectrometer.
Figure 10:
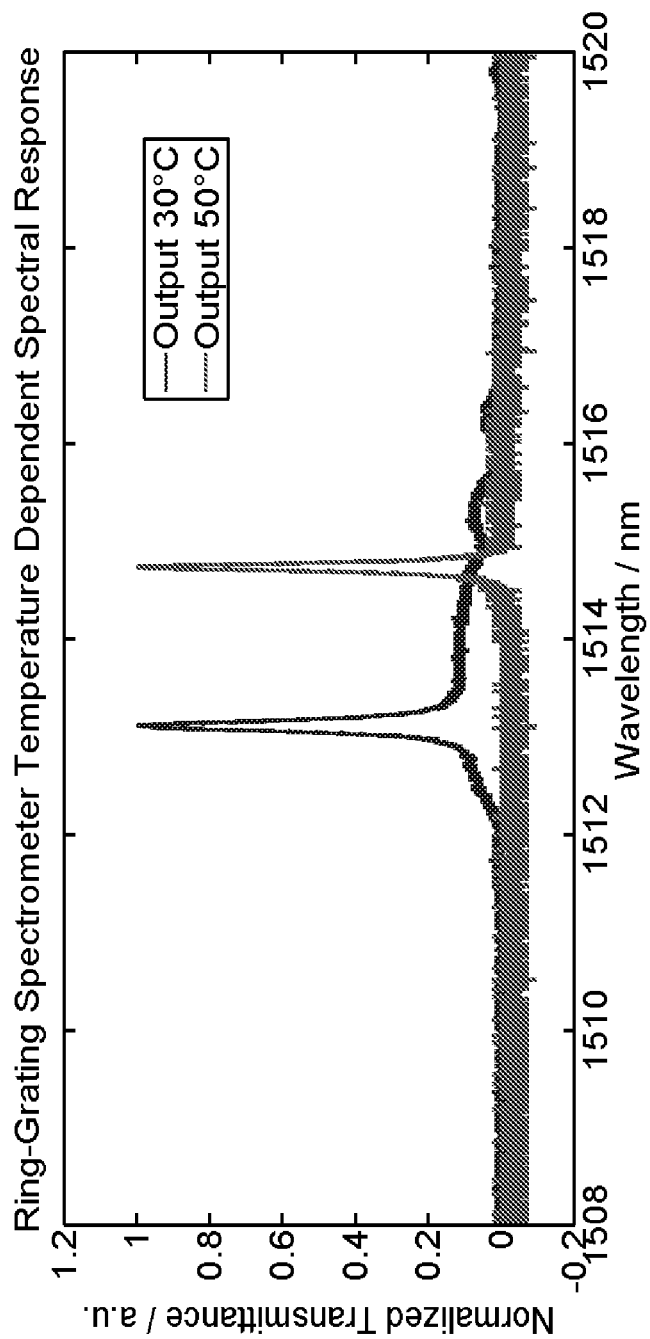
FIG. 10 shows an experimentally measured spectral response of an exemplary ring-grating spectrometer.

The suggested design for the ring-grating spectrometer can be configured in various manners. In some implementations, a ring-grating spectrometer includes SOI waveguides. In some implementations, the ring-grating spectrometer is fabricated using standard complementary CMOS processing techniques on a 250 nm SOI substrate. In some implementations, the waveguide cladding material includes silicon dioxide. The index tuning may be performed using the thermo-optic effect. FIGS. 9a and 9b show electron microscope images of a DBR component and ring resonator component, respectively, of an exemplary ring-grating spectrometer. The temperature dependent spectral response of the device is illustrated in FIG. 10. The spectral response of FIG. 10 corresponds to the output port labelled "Ring Drop Port" in FIG. 8A which displays a single narrow, well isolated resonance peak that is suitable for spectral analysis.

Hybrid Resonator Spectrometer

Figure 11A:
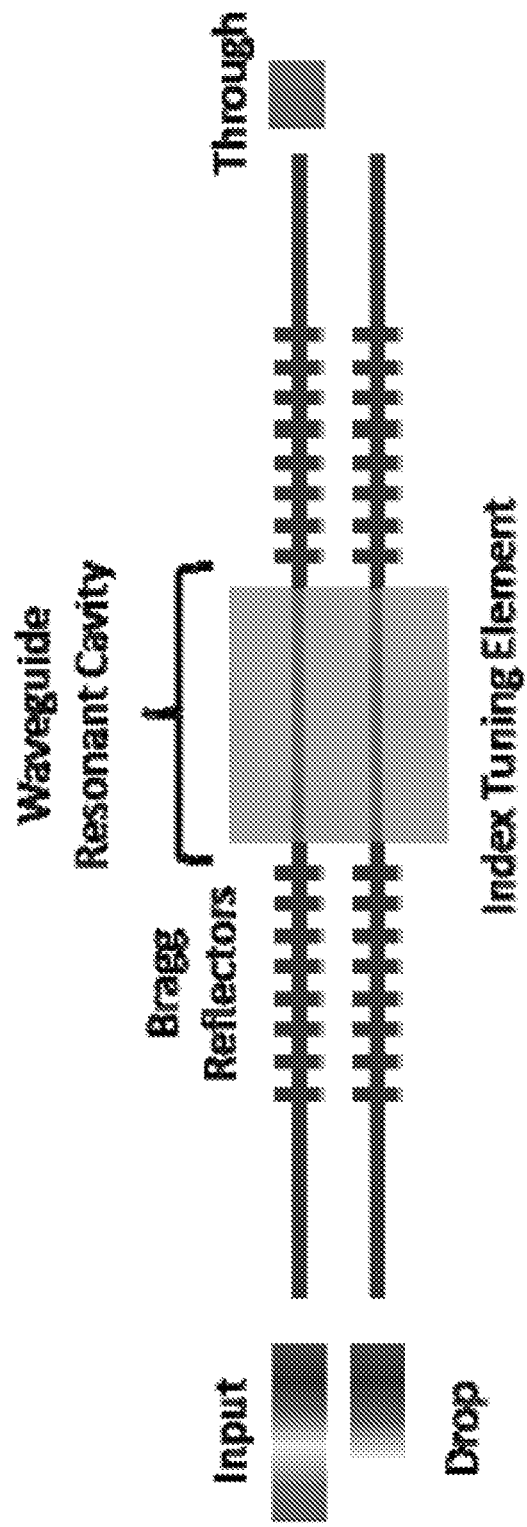
FIG. 11A shows a resonator spectrometer by using a resonance cavity formed by sequential Bragg reflectors.

FIG. 11A shows a resonator spectrometer by using a resonance cavity formed by sequential Bragg reflectors. This arrangement has advantages in terms of packing density and partition bandwidth.

Figure 11B:
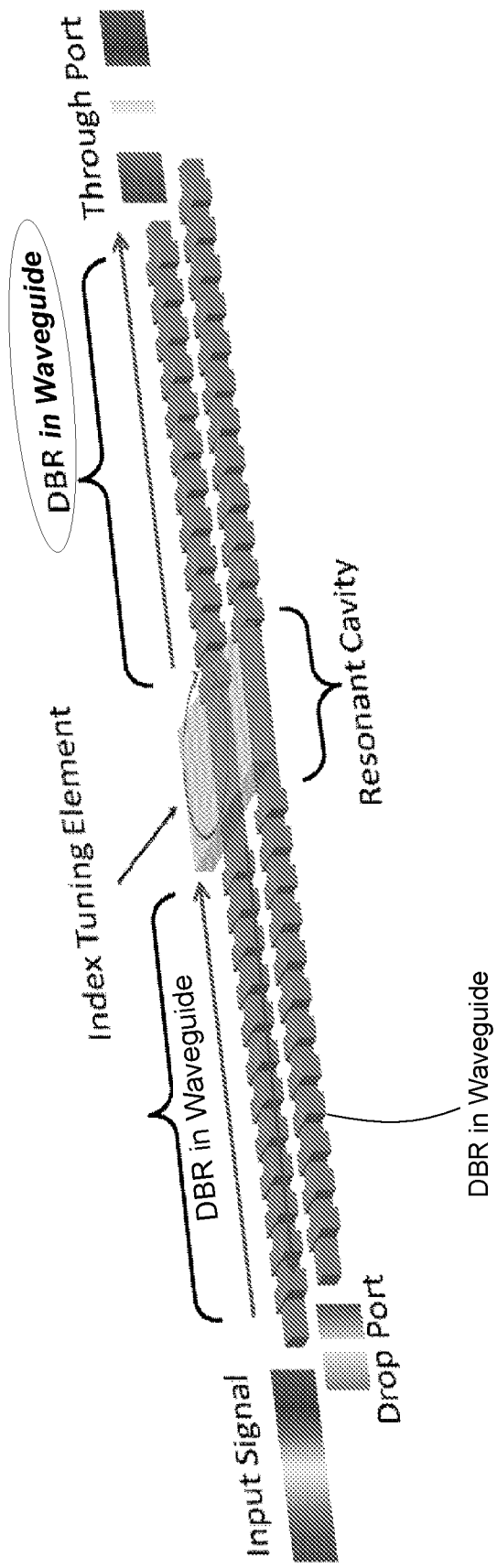
FIG. 11B shows specific example of a hybrid resonator spectrometer including DBR mirrors and a resonance cavity based on the design in FIG. 11A.
Figure 12:
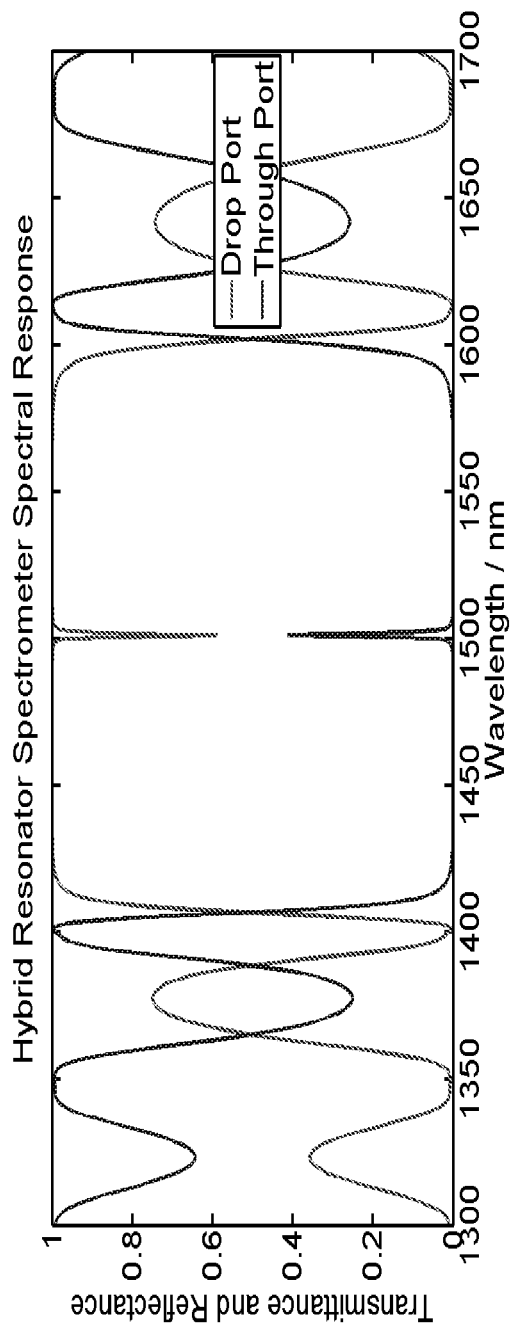
FIG. 12 shows a spectral response of the hybrid resonator spectrometer shown in FIG. 5.
Figure 13:
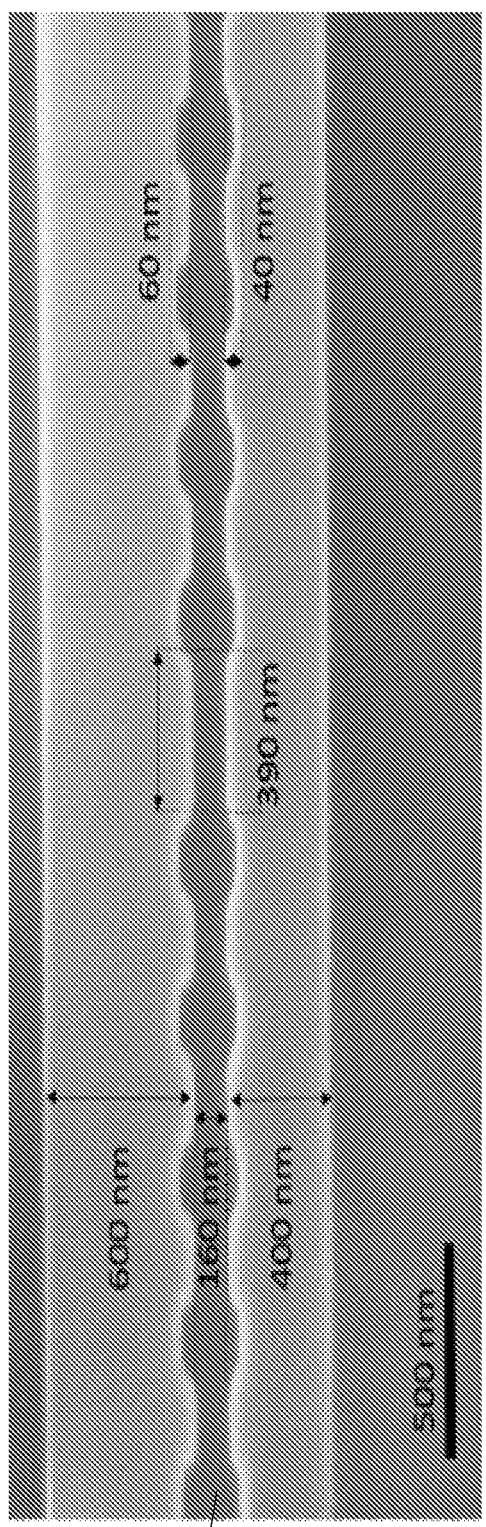
FIG. 13 shows an electron microscope image of an exemplary hybrid resonator spectrometer.
Figure 14:
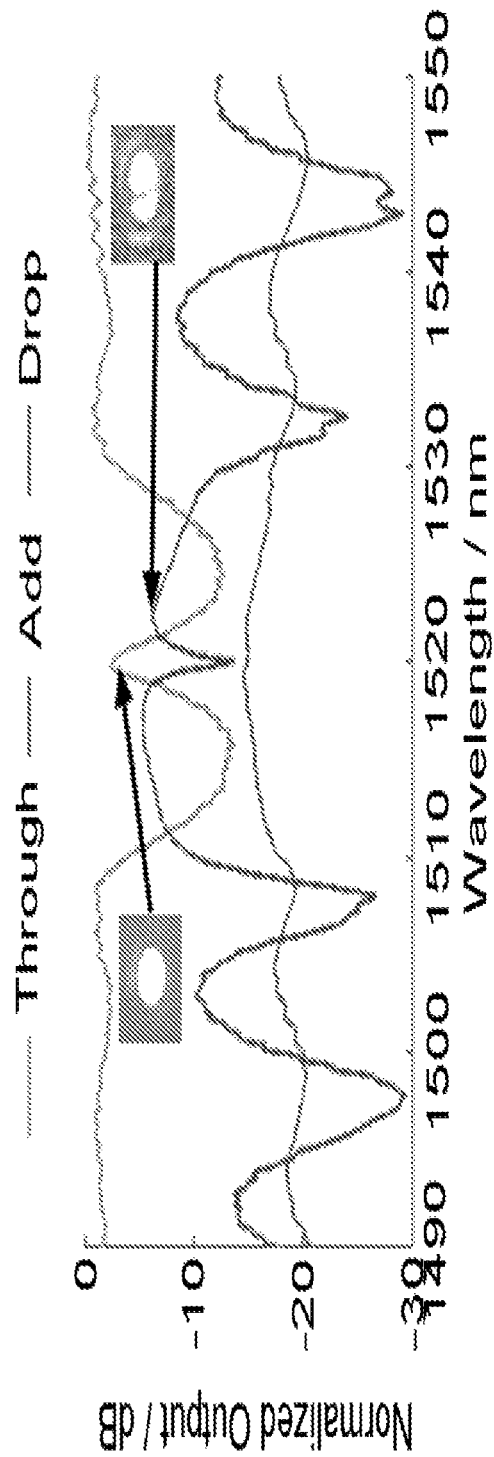
FIG. 14 shows an experimentally measured spectral response of an exemplary hybrid resonator spectrometer.

FIG. 11B shows specific example of a hybrid resonator spectrometer including DBR mirrors and a resonance cavity based on the design in FIG. 11A. Referring to FIG. 11A, the hybrid resonator spectrometer employs a pair of tunable DBR mirrors separated by a tunable cavity. The hybrid resonator spectrometer of FIG. 11B operates in a manner similar to the second design as shown in FIGS. 7A, 7B, 8A and 8B but the FIG. 11B combines the filters and optical resonator. This arrangement has advantages in terms of packing density and partition bandwidth. The spectral response of such a device is illustrated in FIG. 12. The presence of a cavity causes resonant lines to appear in the stopband of the DBRs. The DBRs, however, have a limited stopband width. In some implementations, the stopband width can be designed sufficiently that only one resonance appears. The narrow resonance peak within the stopband may be tuned by changing the refractive index of the resonance cavity. In some implementations, the stopband itself may be shifted by tuning the refractive index of the DBR elements. Similar to the design shown in FIG. 3, again, multiple unit cells may be combined to increase the operating spectral range. Apodization of the DBR elements can be employed to reduce side lobes, if necessary The suggested design for the hybrid resonator spectrometer can be configured in various manners. In some implementations, the hybrid resonator spectrometer includes SOI waveguides. In some implementations, the hybrid resonator spectrometer is fabricated using standard complementary CMOS processing techniques on a 250 nm SOI substrate. In some implementations, the waveguide cladding material includes silicon dioxide. In some implementations, the index tuning may be performed using the thermo-optic effect. The experimental hybrid resonator is shown in FIG. 13. The measured spectral response of the device is illustrated in FIG. 14. The spectral response of FIG. 14 corresponds to the output port labelled "Drop Port" in FIG. 11. As anticipated it displays a single isolated resonance peak that is suitable for spectral analysis.

Fourth Exemplary Design: Free-Space Non-Scanning Fourier Transform Spectrometer

Pertaining to the free-space non-scanning Fourier transform spectrometer, stationary interferometers (in which the same interference is spatially dispersed to form a pattern measured by a detector array), have been developed towards removing the kinetic scanning element of the system design. This interferometer scheme is conducive to compact system designs and confers rapid measurement owing to the parallelism of the optical path delay measurements. For designs using common optical paths, interference measurements are stable owing to the rigidity of the optical axes. Moreover, stationary interferometers leverage the significant advances made in increasing the pixel density and photometric accuracy of detector arrays, both quantum and thermal, across the visible, NIR, and IR spectra. However, a significant limitation to obtaining spectra by stationary interferometery exists. For example, while increasing the optical path delay within the detector array is possible, the fixed pixel size leads to a decrease in the sampling rate with increasing fringe density, which makes it difficult to achieve high resolution spectra. Although demonstrations of spectrometers with high pixel density have been developed, the interferogram is inherently one dimensional, and is thus limited by pixel density in a single dimension, with the pixels along the opposing dimension presenting a redundancy.

In this patent document, a stationary Fourier transform interferometer is evaluated in two dimensions and referred to as a channel-dispersed Fourier transform spectrometer (CDFTS). A free-space non-scanning Fourier transform spectrometer design disperses the traditional interferogram of Fourier Transform spectroscopy across a discrete detector array to relax the minimum sampling rate needed to recover the spectrum from a single nondispersed interferogram. The length of the measured interferogram, that is, the highest autocorrelation delay measured, is controlled in the stationary interferometer design by increasing the spatial carrier frequency of an interfered beam. This increase compresses the interference pattern within the physical extent of a finite detector array, allowing for greater delays in the interferogram to be measured. In a typical two beam interference, this is achieved by increasing the mutual interference angle between the beams. Generally, the domain width of the measured interferogram is inversely proportional to the resolution of the recovered spectrum from Fourier transform of the interferogram. Hence, increasing the interferogram mutual interference angle and measuring longer path delays is favorable towards improving resolution.

The dispersive element of the free-space non-scanning Fourier transform spectrometer introduces the option for controllably dividing the signal spectrum across different columns of the detector. Unlike dispersive spectroscopy, the FT interferogram is still obtained for each column, allowing for the dispersed spectrum to be arbitrarily compressed within a pixel column without direct loss of resolution. As each column measures the interferogram a continuous subset of the total spectral domain, the sampling requirement of interferogram in each dispersed channel is reduced. With a reduced minimum sampling rate in each channel, the interferogram can be compressed within the column to measure higher autocorrelation delays, and thereby obtain higher resolution This resolution gain is tempered by a minimum Nyquist sampling rate. In a stationary Fourier transform (FT) spectrometer, the measured interferogram is recorded and binned at discrete steps of optical path difference. With fixed detector length and pixel count, increasing the interference angle to compress the interferogram within the detector span results in larger steps of path difference measured per pixel. Since the pixel dimensions along the row are fixed, the sampling rate will decrease as the spatial frequency carrier is increased. Hence, the resolution gain by measuring larger optical path differences of the interferogram is limited by the sampling frequency needed to recover the spectrum without aliasing, which in particular, is the Nyquist frequency of twice the bandwidth of the spectrum.

As established above, the following measurement relation between the real interferogram $\Gamma(\tau)$ as a function of optical path difference $\tau$ centered at $v_0$ measured on $[-\tau_0, \tau_0]$ and its power spectrum $G(v)$ can be considered:

$$\Gamma(\tau) = \operatorname{sinc}(cK_B\tau)\cos(2\pi v_o\tau)\operatorname{rect}\left(\frac{\tau}{T_o}\right) \leftrightarrow G(v) = \qquad \text{Eq. (33)}$$

$$\operatorname{rect}\left(\frac{v - v_o}{cK_B}\right) * \operatorname{sinc}(T_o v)$$

The experimental boundaries here are the maximum path delay $T_o$, the center frequency $v_o$, and the spectrum bandwidth $K_B$ (in wavenumbers [cm$^{-1}$]). For a broadband source approximated as an analytical flat-top box spectrum of bandwidth $K_B$, $G_o(v)$ is a rectangular function and it can be shown to be the following:

$$\tau = \frac{2\sin\alpha}{c}x \qquad \text{Eq. (34)}$$

Where c is the speed of light. In the case of the stationary interferometer, $T_o$ is the path difference along the spatial interference pattern on the imaging detector of width $X_o$. The optical path difference is mapped to the spatial coordinates for two plane waves with interior half-angle $\alpha$ as follows:

$$T_0 = \frac{2\sin(\alpha)}{c}X_0 \qquad \text{Eq. (35)}$$

At the maximum measure path different $T_o$, if the detector has a width $X_o$ along the interferogram length, then $T_o$ can be shown as follows:

$$\Delta\tau = 2\frac{\sin(\alpha)}{c}\Delta x < \frac{1}{2cK_B} \Leftrightarrow K_B < \frac{1}{\Delta x \sin(\alpha)} \qquad \text{Eq. (36)}$$

Nyquist criterion requires that the sampling rate be twice the half-bandwidth of the signal, $cK_B$. Noting $\Delta x$ to be the pixel width, or sampling interval, the following expression for the maximum Nyquist sampling interval is found for a detector sampling of pixel width $\Delta x$:

$$T_0 > \frac{1}{2\Delta k} \Leftrightarrow \Delta k > \frac{1}{X_0\sin(\alpha)} \qquad \text{Eq. (37)}$$

The resolution of the recovered spectrum can be evaluated as the inverse optical path difference window of the measured interferogram. If $\Delta k$ is our desired spectral resolution in wavenumbers, then the required measurement window is:

$$N_{px} > \frac{K_B}{\Delta k} \qquad \text{Eq. (20)}$$

Combining Nyquist and resolution criterion yields the following expression:

$$N_{px} > \frac{K_{B,channel}}{\Delta k} = \frac{K_B}{\Delta k N_{py}} \Leftrightarrow N_{px}N_{py} > \frac{K_B}{\Delta k} \qquad \text{Eq. (21)}$$

where $N_{px}=X_0/\Delta x$ is the number of pixels along the interferogram direction. Hence, for a fixed signal resolution, increasing signal bandwidths force stationary Fourier transform spectrometers to require higher pixel density in fixed-size detector arrays in order to recover the spectrum without aliasing.

From the above analysis, it is clear that smaller signal bandwidths allow for high resolution spectra to be recovered with a fewer number of pixels. In order to leverage this fact, our design spectrally disperses the one-dimensional interferogram pattern across a two-dimensional detector array. The dispersion can be generated by prism, diffractive element, or any similar spectral mapping component. Orienting the 1D interferogram along the detector columns, each column in the 2D detector array is the signal interferogram bandpassed by the dispersion process. Each column is called as a spectral channel, and while each channel can be of a single-pixel width, channels with multi-pixel widths can be binned to a column with single pixel width. The center of the bandpass is determined by the particular dispersion angle mapped to the channel, and the bandwidth of the channel is determined by the spread of the dispersion system. For a signal bandwidth spread evenly across $N_{py}$ spectral channels, the tradeoff described before can be recast as follows:

$$I_{b,n} = \Delta_b \left\lfloor \frac{I_n}{\Delta_b} \right\rfloor \qquad \text{Eq. (22)}$$

Since the signal bandwidth per channel now occupies a smaller fraction of the total signal bandwidth, the minimum number of pixels required along the interferogram axis to avoid aliasing is now lowered by the number of channel divisions $N_{py}$.

Figure 15:
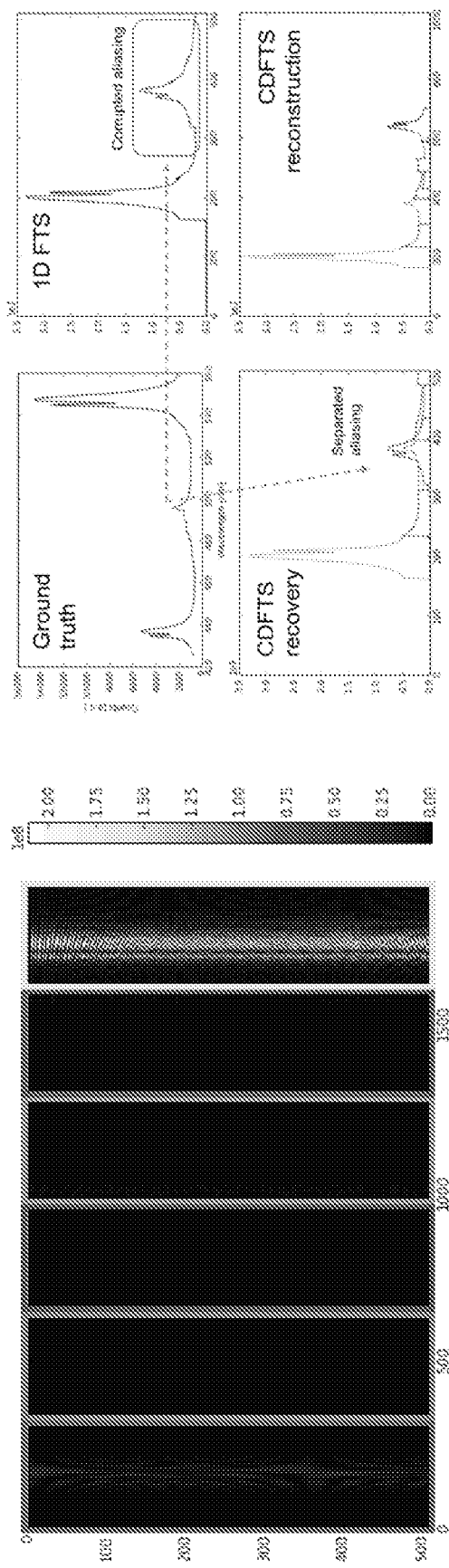
FIG. 15 shows a simulated recovery of a mercury lamp spectrum.

The advantage of CDFTS in avoiding undersampling corruption is shown in the simulated recovery of a mercury lamp spectrum of FIG. 15. A two dimensional interferogram of the spectrum was numerically generated with maximum 1.5 ps optical path delay on a 512×1920 pixel detector. With spectral dispersion spanning the column indices, six dispersion channels are defined by partitioning the interferogram into 512×320 pixel column and collapsing each into one dimensional 512 pixel interferogram, and Fourier transform spectra are recovered for each channel by repeated application of EH for each column interferogram. Just as in the one dimensional or single channel case, the overlay of channel spectra show aliasing owing to the insufficiently sampled center frequency of each channel. However, owing to the channel separation, the overlapped spectra are contained in separate channels, and un-aliased recovery can be obtained by reflecting the undersampled channels across the maximum frequency point. A slight distortion can be seen. In practice, the channel division (or number of detector row elements) must be carefully chosen such that the band edges are both oversampled or both undersampled. It should be noted that while aliasing in the channels can be considered to be occurring, the aliasing is with respect to the center frequency of the signal, while the signal band is not aliased, and can be perfectly recovered provided the leading frequency edge is oversampled or the trailing frequency edge is undersampled.

When sampling the optical interferogram, the true intensity value at each delay point is approximated by a digital value. The absolute difference between the recorded representation and the true value results in an error term that propagates to the reconstructed spectrum as noise where in general, the differential error is proportional to bit depth of the signal. For detector arrays, the dynamic range of the detector encoder and its effective number of bits define the accuracy of the reconstructed spectrum. In particular, Fourier transform spectrometer interferograms are characterized by a high intensity value at the centerburst, or zero-path delay with broadband constructive interference, and quickly decay in intensity with increasing path delay in the interferogram owing to the destructive interference. Understanding that the reconstruction accuracy of the high resolution components of the spectrum are dependent on the large path delay components of the interferogram, the detection quantization level can be understood to strongly affect the accuracy of the high resolution components. In addition to improving detector bit depths, techniques such as gain ranging and reversible signal chirping have been developed to reduce the interferogram signal dynamic range to more closely match the acquisition dynamic range.

Figure 16:
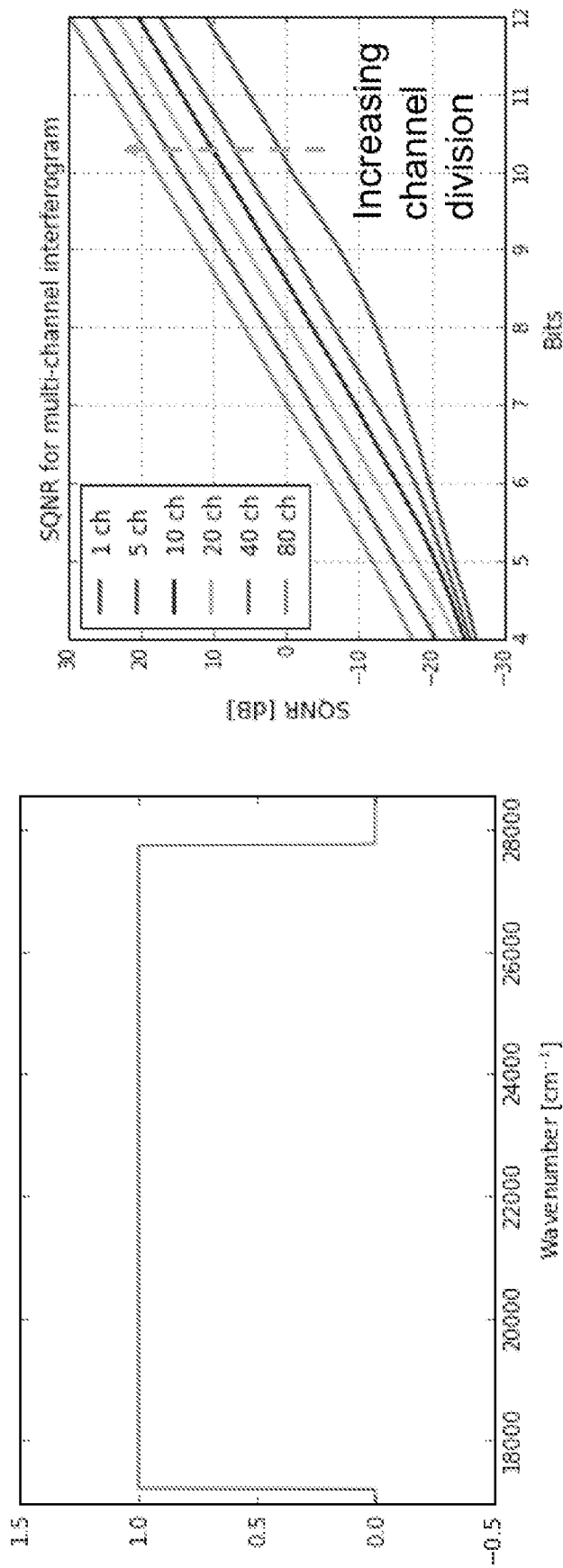
FIG. 16 shows a simulated noise-free quantization of a two-dimensional dispersive interferogram.

By employing spectral dispersion in our two-dimensional interferogram, the number of constructively interfering terms at the centerburst in each channel is reduced in proportion to the fraction of bandwidth reduction. To illustrate the concept, the noise-free quantization of a two-dimensional dispersive interferogram is simulated. FIG. 16 shows a simulated noise-free quantization of a two-dimensional dispersive interferogram. The noise-free quantization of a two-dimensional dispersive interferogram is derived by a boxcar spectrum with uniform contributions from a continuous distribution of spectral components spanning the 360 to 580 nm wavelength range. A uniform quantizer is applied on each dispersed channel interferogram $I_n$ for bit depth b, $$E_b = \sum_n \sum_x |F_{b,n}[x] - F_{64,n}[x]|^2 \qquad \text{Eq. (23)}$$

where $\Delta b = 2\text{-}b$ is the quantization level for a signal normalized to one. Computing the Fourier transform in each channel yields a reconstructed spectrum spectrum Fb,n, and the mean squared error (MSE) of the bit-depth b quantized signal from the ground truth reconstruction (a 64-bit quantization) is computed as follows:

$$I_{out} = \frac{I_1}{2} + \frac{I_2}{2} + \sqrt{I_1}\sqrt{I_2} \cdot \cos(\phi_1 - \phi_2) \qquad \text{Eq. (7)}$$

Having calculated the MSE for each n-channel CDFTS recovered boxcar spectrum, the ratioed signal power to MSE or signal to quantization noise ratio (SQNR) could be computed and shown as a function of bit-depth for each channel. For larger bit depths where the error is small enough compared to the signal power for the additive noise term approximation to be valid, SQNR can be seen to be linearly proportional to bit depth in accordance with the process error of the uniform quantizer, and importantly, shows a 3 dB increase or doubling in SQNR with every doubling with the channel divisions. Intuitively, spectral dispersion of the 1-dimensional interferogram along the detector row axis amounts to spectral filtering of the interferogram in each detector column, and thus, the centerburst in each column is reduced in proportion to the bandwidth reduction. With each channel interferogram scaled to the detector dynamic range to efficiently use the available encoding bits, the signal dynamic range in the CDFTS case is reduced and the requirement for high DNR detection is relaxed.

The suggested CDFTS can be configured in various ways. In some implementations, the schematic for the CDFTS can be abstracted into elements that function independently on the normal planes of the optical path. By acting on the separate dimensions, a spatial interference pattern or interferogram can be brought to run along the detector plane in one axis, and dispersed along the second plane in the second axis, each spanning a plane with the optical path. These orthogonal axes are referred to as the dispersion axis and the interference axis, respectively. In the interference axis, a generalized two-slit spatial filter is placed in the focal plane of a cylindrical lens with curvature in which generates a spatial interference pattern spanning the interference axis of the detector plane. In the dispersion axis, a generalized dispersion element depicted as a diffraction grating in the focal plane of a cylindrical lens is used to separate the interferogram into spectral components spanning the dispersion axis of the detector plane. Physically, this interferometer shares a similar topology with several spectral interference schemes used for pulse characterization such as FROG and spectral interferometers, but provides novel advantages in its implementation as a Fourier transform interferometer, namely in providing high resolution spectra for large bandwidth signals or equivalently, low pixel count detector systems.

In some implementations of the disclosed technology, the operation of CDFTS is demonstrated as both a Lloyd mirror interferometer, and a Sagnac interferometer. Free-space Fourier transform spectrometers operating as Michelson interferometers in the mechanical scanning implementation or as Mach-Zehnder interferometers in the stationary implementations are sensitive to mechanical vibrations that independently add noise to the optical path difference in each interferometric arm. Interferometric arms in topologies such as the Lloyd mirror and Sagnac interferometers utilize common optical paths, and as such, noise in the two optical path lengths are canceled in their difference.

Figure 17A:
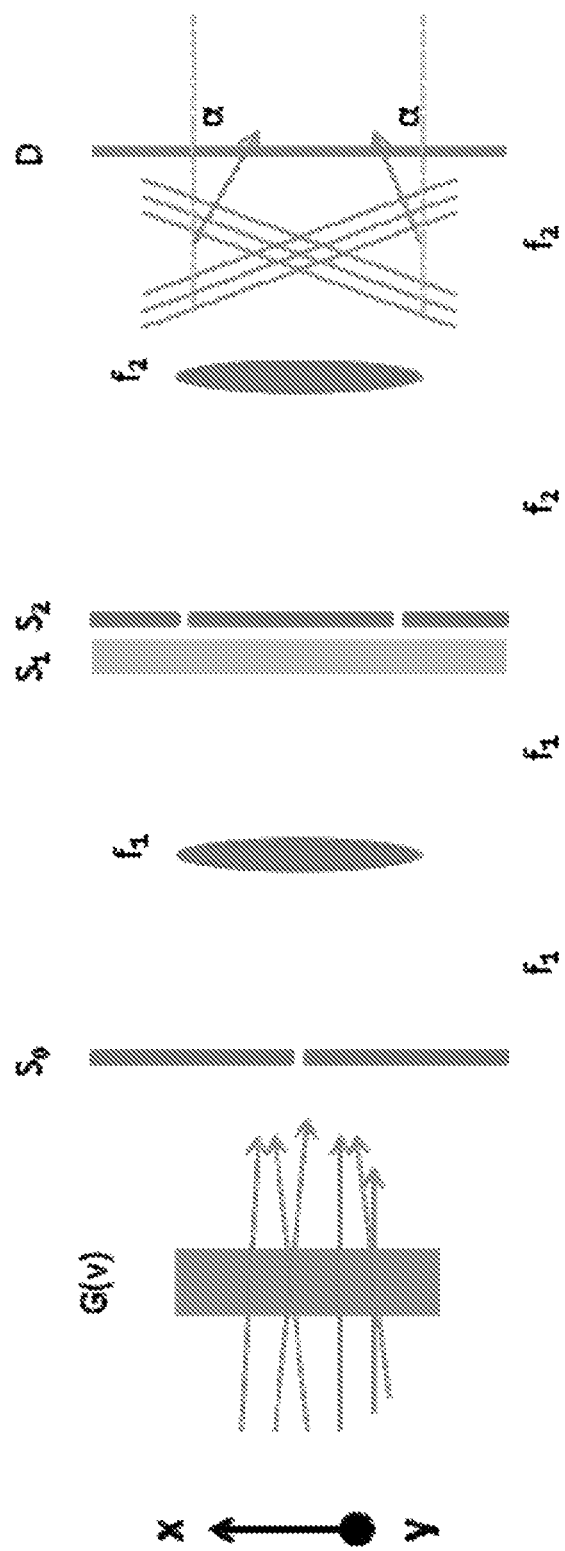
FIGS. 17A and 17B illustrate the operation of a free-space non-scanning Fourier transform spectrometer design that disperses the traditional interferogram of Fourier Transform spectroscopy across a discrete detector array to relax the minimum sampling rate needed to recover the spectrum from a single nondispersed interferogram.
Figure 17B:
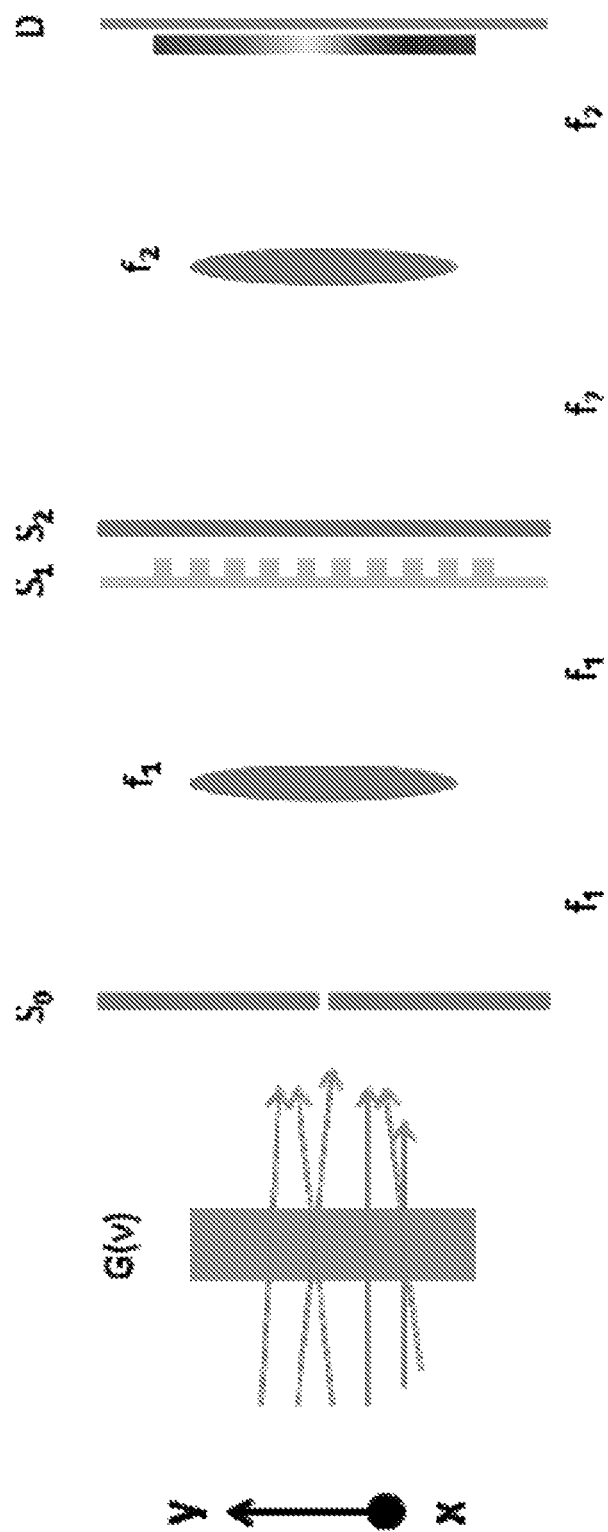

FIGS. 17A and 17B illustrate the operation of a free-space non-scanning Fourier transform spectrometer design that disperses the traditional interferogram of Fourier Transform spectroscopy across a discrete detector array to relax the minimum sampling rate needed to recover the spectrum from a single nondispersed interferogram. The length of the measured interferogram, that is, the highest autocorrelation delay measured, is controlled in the stationary interferometer design by increasing the spatial carrier frequency of an interfered beam in the y-normal plane (FIG. 17A). This increase compresses the beam within the bounds of a finite detector array, allowing for greater delays in the interferogram to be measured. In a typical two beam interference, this is equivalent to increasing the mutual interference angle between the beams. The extent of the interferogram measured is inversely proportional to the resolution of the recovered spectrum from Fourier transform of the interferogram. Hence, increasing the interferogram mutual interference angle and measuring longer path delays is favorable towards improving resolution. This resolution gain is tempered by a minimum Nyquist sampling rate. In a stationary FT spectrometer, sampling of the interferogram is per discrete pixel. Looking at dispersing the interferogram along a row of the detector in the x-normal plane (FIG. 17B), when the row is filled with a greater extent of the interferogram, the detector dimensions are unchanged, which constitutes an increasing ratio of total measured delay to row width, or equivalently, an increasing ratio of delay per pixel to pixel width. Since the pixel dimensions along the row are fixed, the sampling rate will decrease as the spatial carrier frequency is increased. Hence, the resolution gains garnered by spatial carrier frequency increase is upper bounded by the sampling frequency needed to recover the spectrum without aliasing, which in particular, is the Nyquist frequency of twice the bandwidth of the spectrum.

Figure 17C:
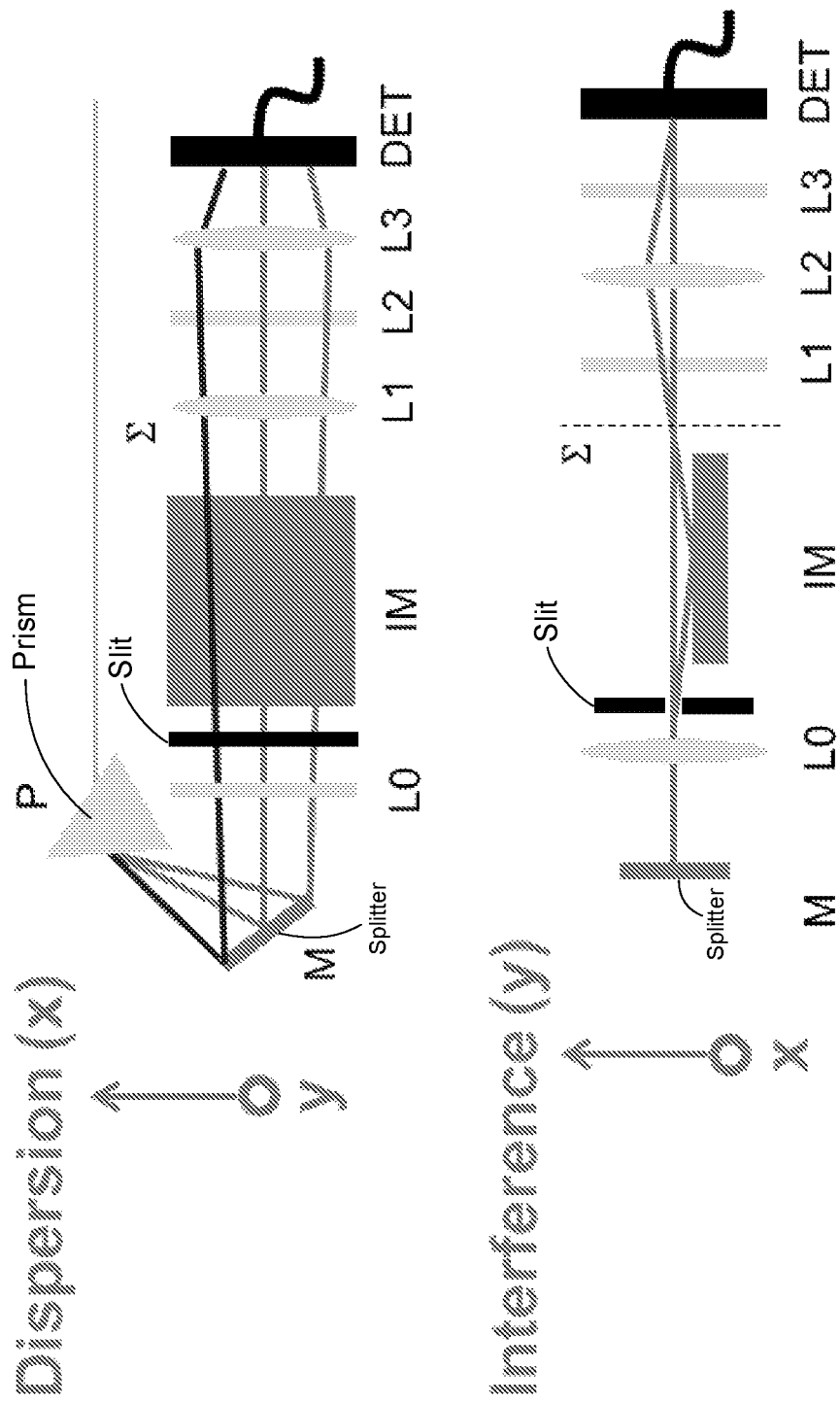
FIG. 17C shows an illustration of an operation of a channel-dispersed Fourier transform spectrometer (CDFTS) having a channel-dispersed Lloyd mirror.

FIG. 17C further shows an implementation of the CDFTS as a channel-dispersed Lloyd mirror. Along the x-axis, the prism angularly separates the signal beam image (yellow) into its spectral components and resolves the content using cylindrical lenses L1 and L3 across the detector row at the DET plane. Choice of L1 and L3 focal lengths can adjust the magnification, and the fraction of the dispersed signal spectrum spanning DET. L0, and L2 curvature are out of the plane, operating on the image in the y-axis, and mirror IM surface normal is similarly oriented to operate in the y-z plane. Along the y-axis, a variable slit placed between L0 and IM is used as a spatial filter to restrict the source size of the input beam; in general, smaller source extent will result in improved fringe visibility. As an adjustable one-dimensional iris, this is similar to the maximum beam extent considered in Jacquinot beam throughput or etendue for a traditional FT spectrometer. Element IM is central to the Lloyd mirror arrangement: a bundle of diverging light rays from the slit angled towards IM are reflected and interfere with a bundle of diverging light rays angled above the mirror. Conceptually, the mirror acts by reflecting a virtual slit image across the mirror face and the two slits interfere at $\Sigma$ to generate a two-slit interference pattern, with the difference that the symmetric point of interference in $\Sigma$ is a null owing to the it-phase shift of the mirror. Finally, cylindrical lens L2 images the $\Sigma$ plane to span the interference pattern across the x-axis of DET. This system can be tailored to the specific spectra to be measured. For high resolution spectra, the IM mirror can be displaced in y away from the slit center; this creates an increased separation between the physical slit and the virtual slit, extending the total optical path difference measured along the detector axis.

Figure 18:
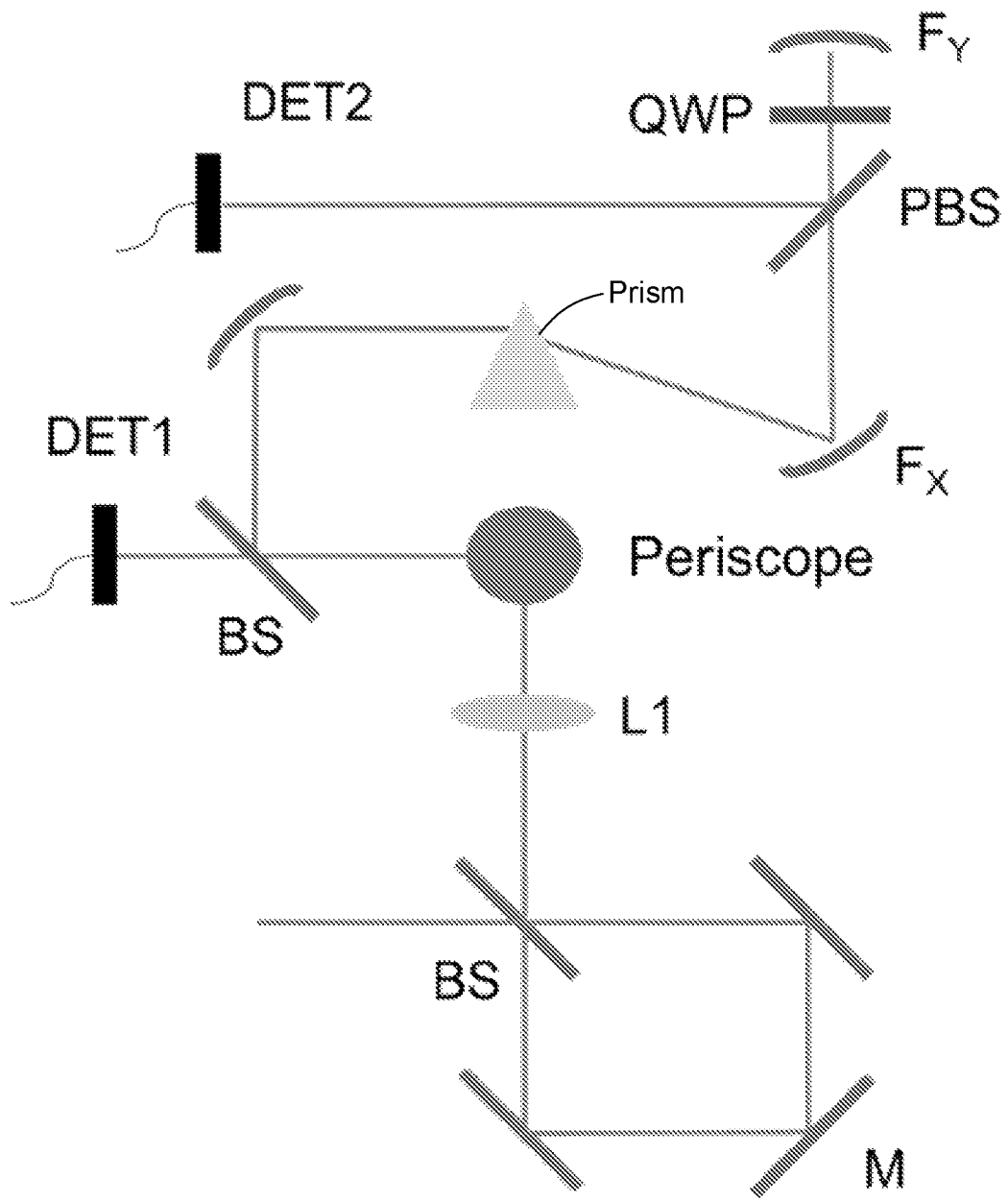
FIG. 18 shows a conceptual illustration of an operation of a CDFTS as a Sagnac interferometer.

A similar dispersive Sagnac arrangement can be constructed to implement the CDFT spectrometer. FIG. 18 shows a conceptual illustration of an operation of a CDFTS as a Sagnac interferometer. A Sagnac interferometric ring splits a collimated optical beam into two counter-propagating common paths that recombine at the exit port. Similar to previous arrangements, spatial interference patterns can be generated by tilting of mirror M within the interferometer plane which breaks the symmetry of the ring to angularly displace the two interferometric beams. A relay lens L1 is used to reimage the beam, and in conjunction with the periscope, rotates the interference pattern 90° and onto DET1 such that the interferometric fringe rulings are parallel to the spectrometer plane. The interference pattern in the DET1 plane can be used to obtain the interferogram for traditional 1D stationary Fourier transform spectrum recovery and is useful as a calibration mechanism. The beam is recollimated by a parabolic mirror element and passed through the prism to generate the angularly separate the spectral components in the spectrometer plane. The interferogram is imaged onto DET2 by cylindrical mirror $F_y$ to resolve the dispersion channels and by cylindrical mirror $F_x$ to generate the interference pattern. The polarizing beam splitter (PBS) and quarter wave plate (QWP) are used to operate the cylindrical mirror $F_y$ on axis and avoid aberrations.

Figure 19:
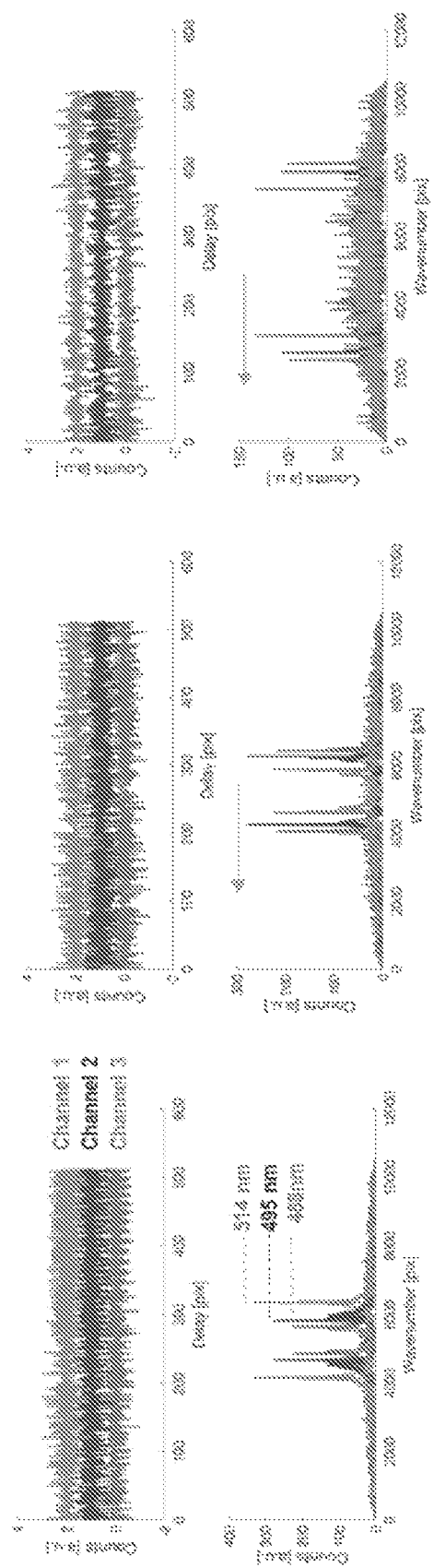
FIG. 19 shows experimental spectral measurements using Lloyd's mirror based CDFTS.

FIG. 19 shows experimental spectral measurements using the Lloyd's mirror based CDFTS. In FIG. 19, the Lloyd's mirror based CDFTS is demonstrated to measure the spectral lines of an Argon ion laser. Three spectral channels were defined in correspondence to the 488, 495, and 514 nm lasing lines. In order to demonstrate the undersampling concept, the 1200 pixel axis spanning the interference pattern data was binned to a 512 pixel count, and mirror spacing was adjusted. With the lines recovered, it can be seen that the recovered 514 nm line in channel 1 sits at low spatial frequencies while the 488 nm line channel 3 sits at high spatial frequencies for small mirror spacings. As predicted, the linewidth of the signal narrows with increasing mirror spacing, corresponding to larger path delays per pixel in the interferogram at the detector plane, i.e. a larger optical path difference of the interferogram being measured. However, with increasing mirror spacings, undersampling effects can be seen in the channels, where the reconstructed lines "reflect" from the high frequency edge, such that the 514 nm channel line sits at higher frequencies with 488 nm at lower frequencies. In this sense, aliasing of the signal at the center frequency does not corrupt the recovered spectra as the spectra in each channel are spectrally bandlimited by the dispersion and independently recorded. Thus overlapping spectra in the one-dimension case can be neatly separated by the CFTS geometry.

Figure 20:
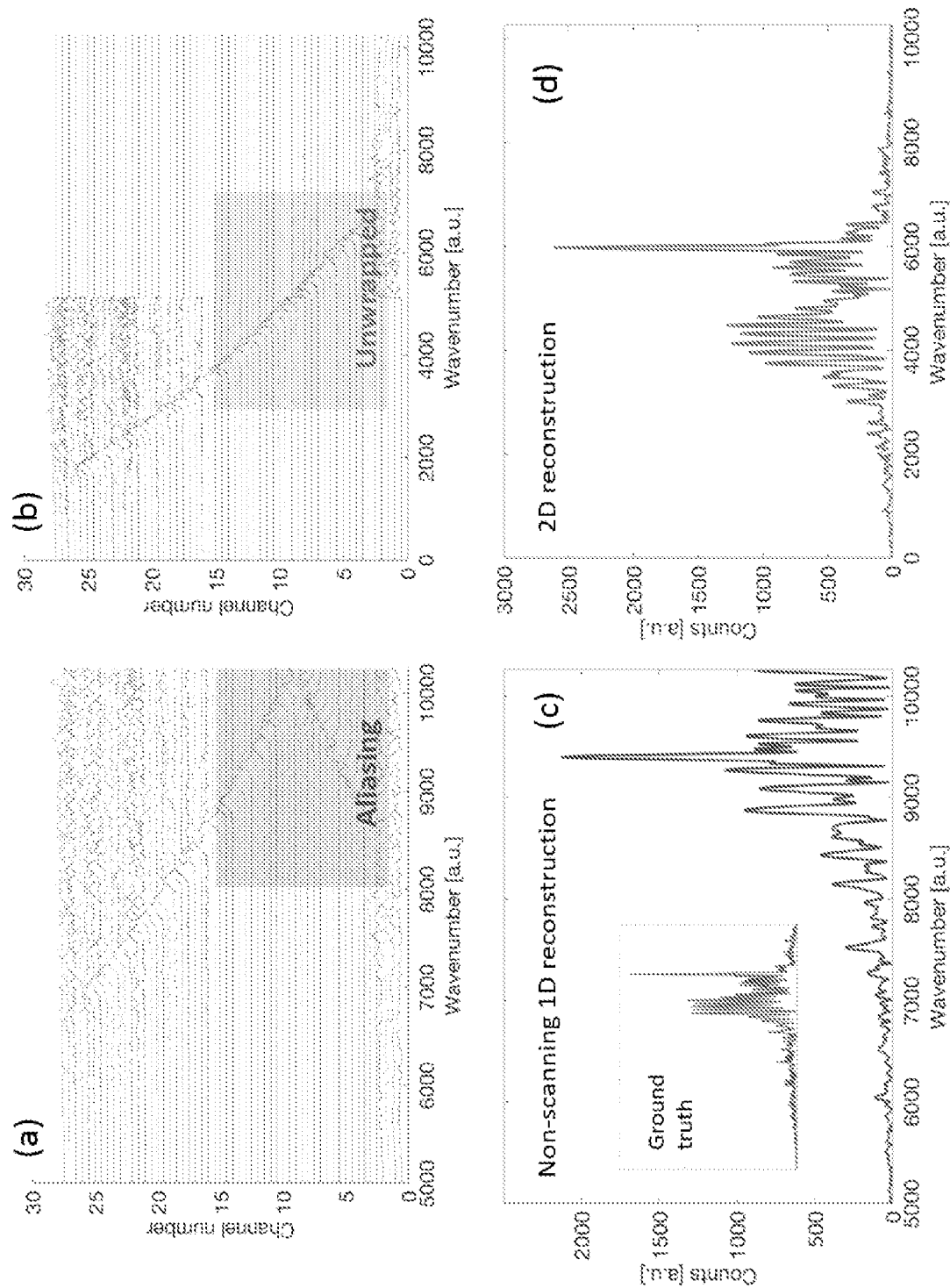
FIGS. 20(*a*) to 20(*d*) show experimental spectral measurements using Sagnac-based CDFTS.

FIG. 20 shows experimental spectral measurements using the Sangnac-based CDFTS. FIG. 20 illustrates the unwrapping recovery of the spectrum in the presence of aliasing, where 128 spectral channels are used (55 are shown).

Spectral aliasing can be seen in the channel Fourier transforms without unwrapping because of the center frequency exceeding the sampling rate. Summing the Fourier transforms is equivalent to the 1D stationary FT spectrometer measurement, and yields the aliased spectrum as shown in FIG. 20(c). CDFTS avoids this aliasing by unwrapping the channel spectra in FIG. 20(b). The unwrapped Fourier transforms can be summed to recover the unaliased spectrum of FIG. 20(d). In FIG. 20, The Sagnac interferemeter based CDFTS is also demonstrated to measure spectral interference from a Xenon arc lamp. The ground truth spectrum is shown in the truth inset of FIG. 12c. The imager was binned to a 256×128 format from the native 1200×1900 format. The 1D nonscanning FT spectrometer can be implemented by simple binning to a 256×1 imager (or 1D array) and after Fourier transform the aliasing of the recovered spectrum is evident in the red curve of FIG. 20(c). The CDFTS dispersive measurement yields 128 channels that are Fourier transformed and shown in magnitude in FIG. 20(a). The aliasing can be distinguished, and is unwrapped by flipping the aliased channels into an empty halfspace as in FIG. 20(b). Complex summation of this unwrapped spectrum is shown in FIG. 20(d) showing improved spectral fidelity over the 1D reconstruction.

Figure 21:
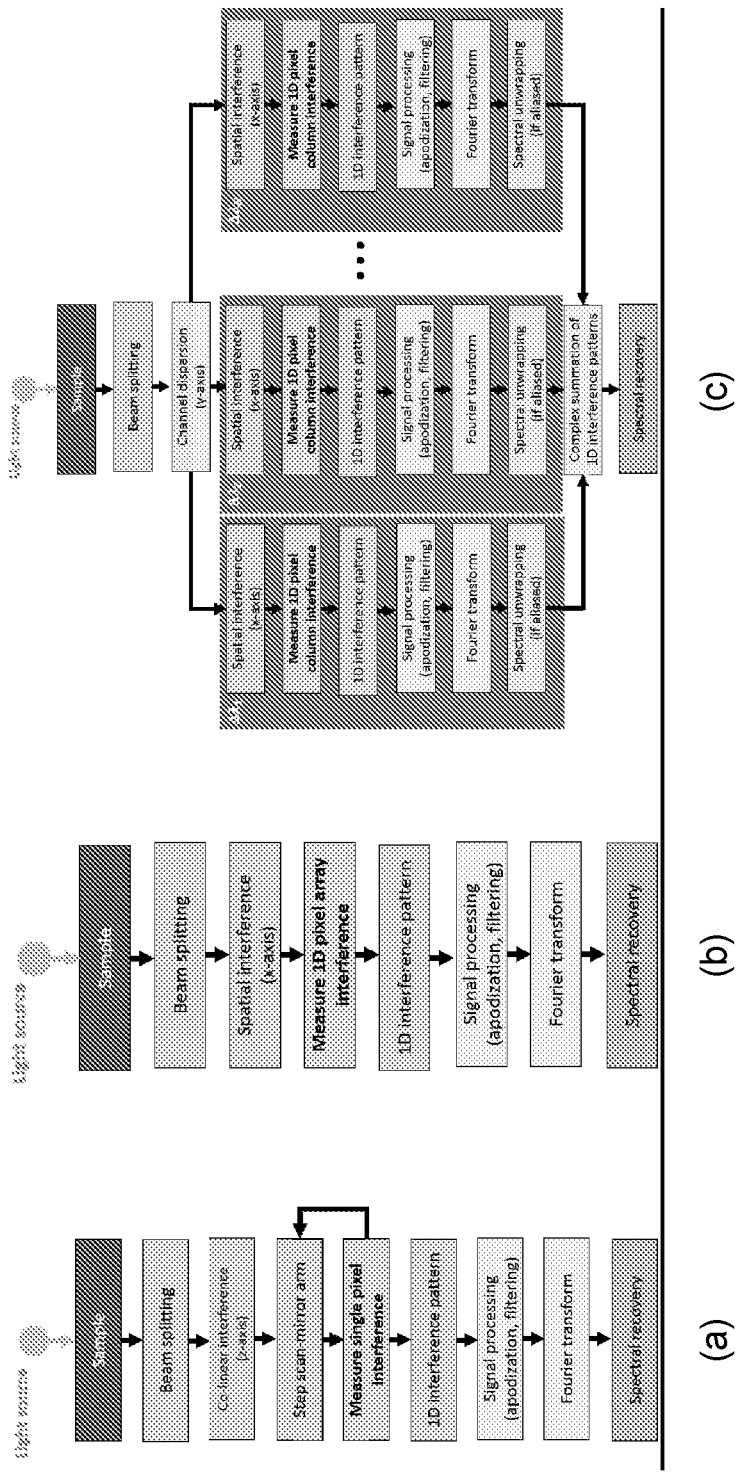
FIGS. 21(*a*) to 21(*c*) show operations of scanning Fourier transform (FT) spectrometer, non-scanning or stationary FT spectrometer, and channel-dispersed FT spectrometer, respectively.

FIGS. 21(a), 21(b), and 21(c) show operations of scanning Fourier transform (FT) spectrometer, non-scanning/stationary FT spectrometer, and channel-dispersed FT spectrometer, respectively. The novel addition to the stationary FT system is the dispersive element, and its contributions to the system are shown in yellow. The suggested design includes an addition to the stationary Fourier transform spectrometer described in prior art. The stationary Fourier transform (FT) spectrometer can be constructed in many different topologies, but fundamentally involves angled interference or shearing of a split wavefront to produce a spatial interference pattern. This is in contrast with the scanning FT spectrometer that interferes the wavefronts co-linearly, or on the same axis and constructs the interference pattern on a single pixel detector by iterative scan measurements. The benefit of the stationary FT spectrometer over the scanning version is the removal of the scanning unit from the system, which is replaced by a snapshot acquisition of the interference pattern. The drawback to this system is the resolution maximum that is limited by the number of pixels in the detector array (or pixel density for equivalent form factor detectors), specifically by the restriction on measurable bandwidth set by the spatial sampling rate.

The novel addition to the stationary FT spectrometer design is to introduce a dispersive element that produces spectral dispersion only along the axis (y-axis) perpendicular to the spatial interference pattern axis (x-axis). This second can be read by a 2D array detector or focal plane array. The interference pattern as seen by the focal plane array can be described as multiple 1D interference patterns, each along the x-axis and a sub-band of the original spectrum. The novel addition overcomes the traditional FT spectrometer limitation of pixel density by reducing the bandwidth in each interference pattern and allowing for larger interference angles for higher spectral resolution to be introduced without aliasing the signal. This novel addition will also reduce the signal dynamic range in each spectral channel, and reduce the quantization error noise.

It will be appreciated that the commercial applications of the various implementations our invention are the same as those for existing spectrometers. Furthermore, the extreme miniaturization and reduced power consumption of our designs have the potential to allow additional applications for which the existing technology is too heavy, bulky, or power inefficient. Furthermore, several concepts introduced are potentially applicable towards relieving the stringent requirements on detectors in stationary FTIR spectrometers, namely pixel size and dynamic range.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A device for analyzing spectral composition of an input light signal, comprising:
   a substrate;
   an input waveguide formed on the substrate and structured to receive the input light signal;
   a waveguide splitter coupled to the input waveguide and structured to split the received input light signal into a first light signal and a second light signal;
   a first optical waveguide connected to the waveguide splitter to receive the first light signal and to transform the first light signal into a first output light signal;
   a second waveguide connected to the waveguide splitter to receive the second light signal and to transform the second light signal into a second output light signal;
   an output port connected to the first optical path and the second optical path and structured to combine the first light signal and the second light signal to cause optical interference that generates interferogram;
   an index-tuning circuit coupled to the first or second optical waveguide to cause a change in an refractive index in the first or second optical waveguide to cause and tune an optical phase shift between the first and second light signals at the output port, the change in the refractive index causing at least one of a non-linear component or a dispersive component in a phase response of the first or second optical waveguide; and
   a circuit coupled to process the generated interferogram by using a Fourier transform based on the change in the refractive index to analyze spectral composition of the input light signal as a function of a wavelength or a frequency of the input light signal, wherein the circuit is further configured to correct the at least one of the non-linear component or the dispersive component.

2. The device of claim 1, wherein the index-tuning circuit is operable to change the refractive index based on a thermo-optic effect.

3. The device of claim 1, wherein the index-tuning circuit is operable to change the refractive index based on a free carrier dispersion effect.

4. The device of claim 1, wherein the index-tuning circuit is coupled to change an index-changing region under the first or second optical waveguide.

5. A device for analyzing spectral composition of an input light signal, comprising:
- an input end structured to receive the input light signal;
- a first waveguide connected to the input end to receive the input light signal and structured to direct the received input light signal along the first waveguide;
- a resonator optically coupled to the first waveguide to carry at least a portion of the received input light signal and structured to function as a filter with a reflective index that is tunable;
- a second waveguide optically coupled to the resonator to receive filtered light from the resonator and structured to provide an output signal; and
- an index-tuning circuit coupled to the resonator to cause a change in the refractive index of the resonator to direct different spectral components in the input light signal to be filtered through the resonator in the output signal, and wherein the first optical waveguide includes a tunable distributed Bragg reflector to filter light that is coupled into the optical resonator.

6. The device of claim 5, wherein the resonator includes a ring resonator between the first waveguide and the second waveguide.

7. The device of claim 5, wherein the index-tuning circuit is operable to change the refractive index based on a thermo-optic effect.

8. The device of claim 5, wherein the index-tuning circuit is operable to change the refractive index based on a free carrier dispersion effect.

9. A device for analyzing spectral composition of an input light signal, comprising:
- an input end structured to receive the input light signal;
- a first waveguide connected to the input end to receive the input light signal and structured to direct the received input light signal along the first waveguide;
- a resonator optically coupled to the first waveguide to carry at least a portion of the received input light signal and structured to function as a filter with a reflective index that is tunable;
- a second waveguide optically coupled to the resonator to receive filtered light from the resonator and structured to provide an output signal; and
- an index-tuning circuit coupled to the resonator to cause a change in the refractive index of the resonator to direct different spectral components in the input light signal to be filtered through the resonator in the output signal, and wherein the first waveguide includes a broadband distributed Bragg reflector designed to have a bandwidth equal to a free spectral range of the resonator.

10. The device of claim 9, wherein the resonator includes a ring resonator between the first waveguide and the second waveguide.

11. The device of claim 9, wherein the index-tuning circuit is operable to change the refractive index based on a thermo-optic effect.

12. The device of claim 9, wherein the index-tuning circuit is operable to change the refractive index based on a free carrier dispersion effect.

13. A free-space non-scanning Fourier transform spectrometer device, comprising:
- a light source structured to provide an input light signal;
- a dispersion module arranged to receive the input light signal from the light source and structured to disperse the received light into spectral components along a first axis;
- an interference module arranged to generate a spatial interference pattern spanning a second axis orthogonal to the first axis;
- a detector arranged to receive signals from the dispersion module and the interference module in the first axis and the second axis, respectively.

14. The device of claim 13, wherein the dispersion module includes an optical lens with a focal length to adjust a fraction of the dispersed signal spectrum spanning the detector.

15. The device of claim 13, further comprising a two slit spatial filter placed between the light source and the interference module and structured to limit a portion of the input light signal to enter the interference module.

* * * * *